ized pulses to the coils dependent upon a detected rotor speed, the control element having a normal speed mode wherein the rotor speed is detected by the first coil and wherein only the second coil is supplied with energizing pulses at a frequency corresponding to single coil driving and a self-starting mode wherein the energizing pulses are supplied alternately to the first and second coils to accelerate the rotor to a desired speed, the control element including rotor acceleration and braking circuitry operable during the normal speed mode and including a desired frequency pulse generator, an actual frequency pulse generator, a phase comparator for comparing the widths and phases of the desired and actual frequency pulses, and an accelerating and braking pulse generator for generating pulses which exert an accelerating force on the rotor whenever the phase of the actual frequency pulses leads the phase of the desired frequency pulse and for generating braking pulses which exert braking forces upon the rotor by affecting a short circuit of one of the coils whenever the phase of the actual frequency pulses leads the phase of the desired frequency pulses.

[54] METHOD AND APPARATUS FOR CONTROLLING AND REGULATING A MOTOR WITH A PERMANENT MAGNETIC ROTOR

[75] Inventors: Harald Hoffmann, Konigstein; Dan-Corneliu Raducanu, Bad Soden, both of Fed. Rep. of Germany

[73] Assignee: Braun Aktiengesellschaft, Kronberg, Fed. Rep. of Germany

[21] Appl. No.: 213,785

[22] Filed: Dec. 8, 1980

[30] Foreign Application Priority Data

Apr. 8, 1980 [DE] Fed. Rep. of Germany ....... 3013473

[51] Int. Cl.³ .......................................... H02K 29/04
[52] U.S. Cl. ..................................... 318/696; 368/156
[58] Field of Search ............... 318/138, 254, 696, 685; 368/217, 156

[56] References Cited

U.S. PATENT DOCUMENTS 4,250,435 2/1981 Alley et al. ........................ 318/696

Primary Examiner—J. V. Truhe
Assistant Examiner—Saul M. Bergmann
Attorney, Agent, or Firm—Robert A. Shack

[57] ABSTRACT

A control circuit for driving an electric motor at a substantially constant speed, the motor including a rotor with at least one pair of permanent magnetic poles and a stator provided with a first and second coil, the control circuit including a control element for supplying energizing pulses to the coils dependent upon a 13 Claims, 14 Drawing Figures

METHOD AND APPARATUS FOR CONTROLLING AND REGULATING A MOTOR WITH A PERMANENT MAGNETIC ROTOR

CROSS-REFERENCES TO RELATED APPLICATIONS

The subject matter of a commonly-assigned application Ser. No. 213,769 filed Dec. 8, 1980 by Dan-Corneliu Raducanu is disclosed, but not claimed herein.

BACKGROUND OF THE INVENTION

This invention concerns a process and circuitry for controlling and regulating a motor with a permanent magnetic rotor.

Low-frequency, electromagnetically excited step-by-step switching mechanisms, excited or synchronized oscillator systems, step-switch motors, and synchronous motors are used as electromechanical transducers for time-keeping devices such as quartz clocks, which transmit a stepped-down quartz frequency to a display device. The synchronous motors are driven with an exciter frequency in a self-starting or non-self-starting mode. Such reactive synchronous motors have at least one field coil, to which is applied a synchronous a.c. voltage for the rotary motion of the magnetic field that is generated by the rotor.

Self-starting synchronous motors have a disadvantage of high power consumption. If they are driven by a battery, this involves either a frequent change of battery or batteries of too large a size. Both features are especially undesirable for watches or clocks. Besides the disadvantage of high power consumption, self-starting synchronous motors have the further disadvantage that a pulse that is lost by a pole-jump can no longer be recovered. Such a system cannot keep constant the number of revolutions in a prescribed time interval. Non-self-starting motors can no longer start by themselves if they come to rest during operation, but rather must be restarted by means of a mechanical cranking of the rotor. In addition, with synchronous motors which are cranked, care must be taken that the pointer is precisely adjustable.

With rotating step-by-step switching mechanisms (stepping motors), the motion of a permanent magnetic rotor with n pole pairs, in a stator field that is excited by a.c. or d.c. current pulses, is always used a half or a whole pole-pair step at a time. Step-by-step switching motors with permanent magnetic rotors have a relatively high torque, because of the high magnetic field. They also have high efficiency, and they allow a large step angle when the step motion is suitably damped.

From the literature reference, G. Glaser: "The Technology of Quartz Watches" (Wilhelm Kempter KG, Publishers, 1979, pages 142-161, especially page 153), an arrangement is known which regulates the phase between a quartz oscillator and an electromechanical transducer (motor). With this known arrangement, a phase comparison is performed between the phase of an appropriately stepped-down signal of a nominal frequency delivered by the quartz oscillator and the phase of a signal of an actual frequency that is tapped from the electromagnetic transducer. A particular energy intake per motor period corresponds to every value of the measured phase difference. In this way, a stable phase position of the motor signals establishes itself with reference to the signals from the nominal frequency, depending on the load of the motor. The synchronization signal, that is the nominal frequency signals, can be conducted through an additional synchronization coil, or they can be applied directly additionally to the driving coil, or they can be added to the driving pulses through a circuit. Another, technically more favorable solution is to measure the phase position between the transducer and synchronization signals through a monostable or bistable multivibrator stage, and to control the pulse width of the driving pulses (pulse width control).

SUMMARY OF THE INVENTION

It is an object of this invention to provide a control and regulation method and circuit, according to which a reactive motor with a permanent magnetic rotor will again start by itself if it is stopped during operation, and will react, during normal operation, to a countertorque with an appropriate increase of driving power. It will at the same time need no more than the smallest possible power consumption. Even if the supply voltage drops considerably, perfect operation is secured with great regulation accuracy and speed.

Briefly stated and according to an embodiment of this invention, the disadvantages with the prior art have been overcome by providing that the motor will self-start in a single direction after it has been stopped, or after the rotational speed of the motor has been substantially reduced as a consequence of a strong torque at the shaft of the rotor. This is accomplished by changing over the nominal running operation to a self-starting operation, with one or more prescribable frequencies. During nominal operation, it guarantees a perfect control of the rotational speed of the motor with negligible dead time after the occurrence of a counter-moment. The power requirement of the motor in normal operation is here extraordinarily low. Its perfect functioning, even when the supply voltage is severely reduced, is assured. The solution is therefore universally applicable to watches, extending from a small to a large countertorque, i.e. for small wristwatches or table-top watches up to large wall clocks. It secures a considerable extension of the lifetime of the battery in a battery-driven watch.

BRIEF DESCRIPTION OF THE DRAWINGS

The invention, both as to its organization and principle of operation, together with further objects and advantages thereof, may better be understood by reference to the following detailed description of an embodiment of the invention or taken in conjunction with the accompanying drawings in which.

DETAILED DESCRIPTION OF THE PREFERRED EMBODIMENT

Figure 1:
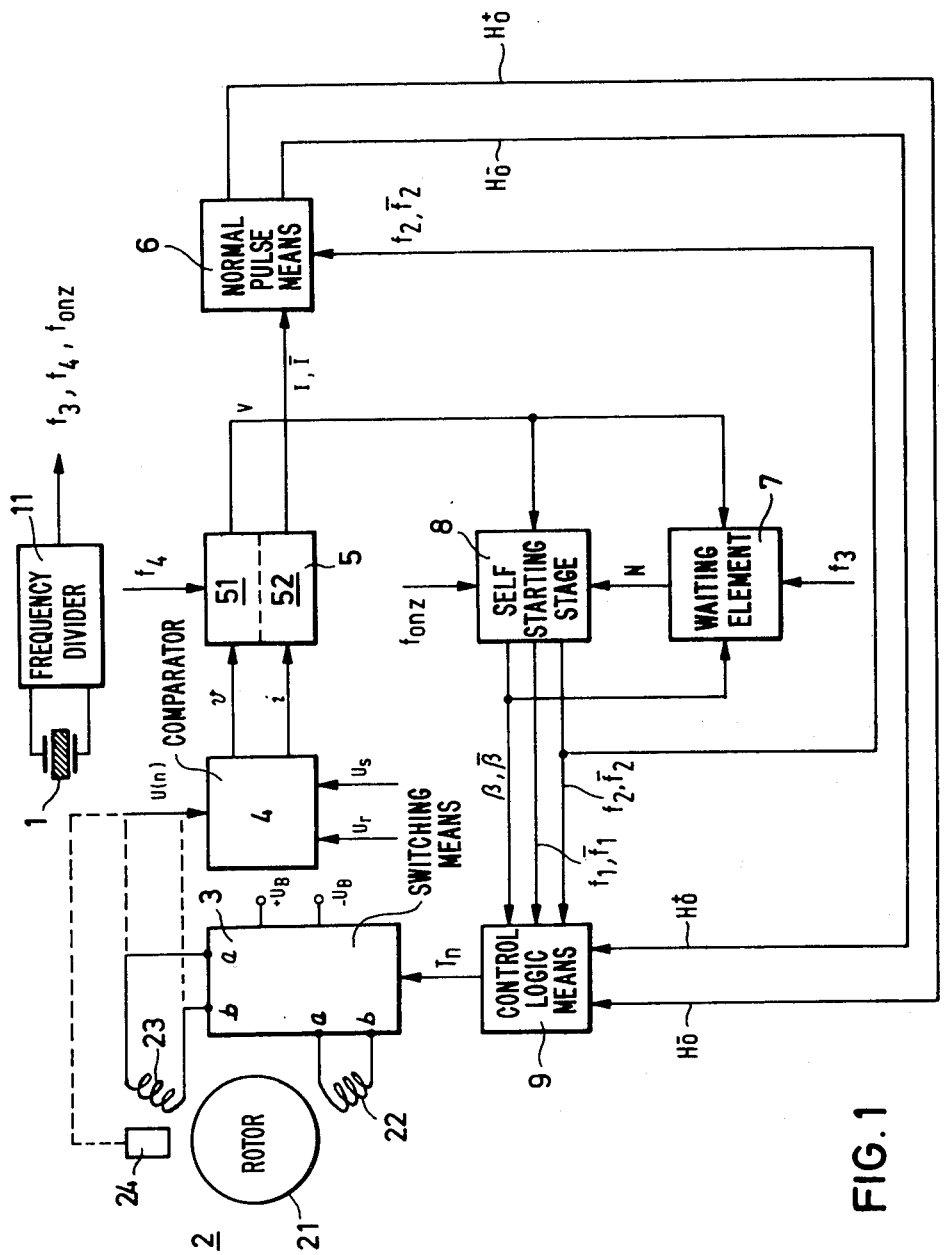
FIG. 1 is a block of a circuit diagram of a reactive motor with a control and regulation arrangement, in accordance with this invention.

FIG. 1 illustrates a reactive motor 2, having a rotor 21, with poles that are formed by permanent magnets, and a stator having a first coil 22 and a second coil 23. If either the first coil 22 or the second coil 23 is charged with pulses, the rotor 21 can be brought to a rotational speed which corresponds to the number of pole pairs and the frequency. The revolutions of the rotor 21 are transmitted through a shaft and through gears to a display system, for application in time-keeping devices such as clocks. For example, this makes possible an analog display with several pointers and a number dial.

A device 24 is provided for sensing the rotational speed n and for delivering a voltage $U_n$, which is proportional to this rotational speed, to control the rotational speed in nominal operation and/or as a criterion to initiate self-starting operation. For example, the device 24 may consist of an optoelectronic, magnetic, or equivalent device. However, the second coil 23 of the stator can, in simple fashion, also be used as a sensor coil, because, just like the first coil 22, it lies within the range of influence of the magnetic lines of the poles of the rotor 21. When the rotor 21 rotates, the magnetic field lines of the poles periodically cut the second coil 23. In this way, a sinusoidal voltage $U_n$ with zero crossings, the so-called sensor signal, is present at the ends of the coil. This sinusoidal voltage $U_n$ is proportional to the rotational speed n of the rotor 21.

This voltage $U_n$, which is proportional to the rotational speed, is applied to the inputs of a comparison element 4, together with two comparison voltages $U_r$, $U_s$. There, the sensor signal is converted into two rectangular pulses for regulating the rotational speed and/or for initiating start-up operation. The vertical edges of these rectangular pulses lie at the interfaces with the constant comparison voltages $U_r$, $U_s$. The output signals v, i of the comparision element 4 are essentially rectangular and are applied to the inputs of an interference-suppression and delay element 5, which is constructed of two components stages 51, 52. In addition, a pulsing frequency $f_4$ is applied to the element 5. For nominal operation, this interference-suppression and delay element 5 delivers actual-value frequency-pulses I, Ī to a control device for nominal operation 6 (i.e., a normal pulse speed means 6). If it should be necessary to initiate self-starting operation, the element 5 delivers self-starting signals V to a self-starting stage 8.

Besides the actual-value frequency-pulses I, Ī the desired-value frequency-pulses $f_2$, $\overline{F}_2$ are conducted to the regulation device for nominal operation 6. At the output of device 6 two different nominal running pulses Ho+, Ho− are delivered.

In addition to the self-starting signal V, one or more mutually different frequency signals $f_{onz}$, as well as a prescribable signal N are additionally applied to the self-starting stage 8. The prescribable signal N is generated in a waiting time element 7, which consists of one or more delay stages. A frequency signal $f_3$ is inputted into the first delay stage, while the reset inputs of all the delay stages are reset synchronously in dependence on the self-starting signal V and on the switchover signal.

From the self-starting stage 8, the switchover signals $\beta,\overline{\beta}$ as well as two pulse trains $f_1$, $\overline{f}_1$ as well as $f_2$, $\overline{f}_2$, together with the nominal running pulses Ho+, Ho− are conducted to a series-connected driving logic circuit 9 (i.e., a control logic means 9). The nominal running pulses Ho+, Ho− are emitted by the regulation device for nominal operation 6. At the outputs of the driving logic circuit 9, pulse trains $T_n$ drive the switches of a series-connected switching stage 3, which is connected both with a voltage source $+U_B$, $-U_B$ and with the coils 22, 23 of the reactive motor 2. The switching stage 3 (i.e., the switching means 3) connects the coils 22, 23 of the reactive motor 2 with one or the other pole of the voltage source $+U_B$, $-U_B$.

A generator is associated with the entire arrangement. This generator has a quartz oscillator 1 and a frequency divider 11, at which rectangular pulses with frequencies $f_3$, $f_4$ and $f_{onz}$ are present. These frequencies are conducted to the above-mentioned points of the appropriate components of the arrangement.

Figure 2:
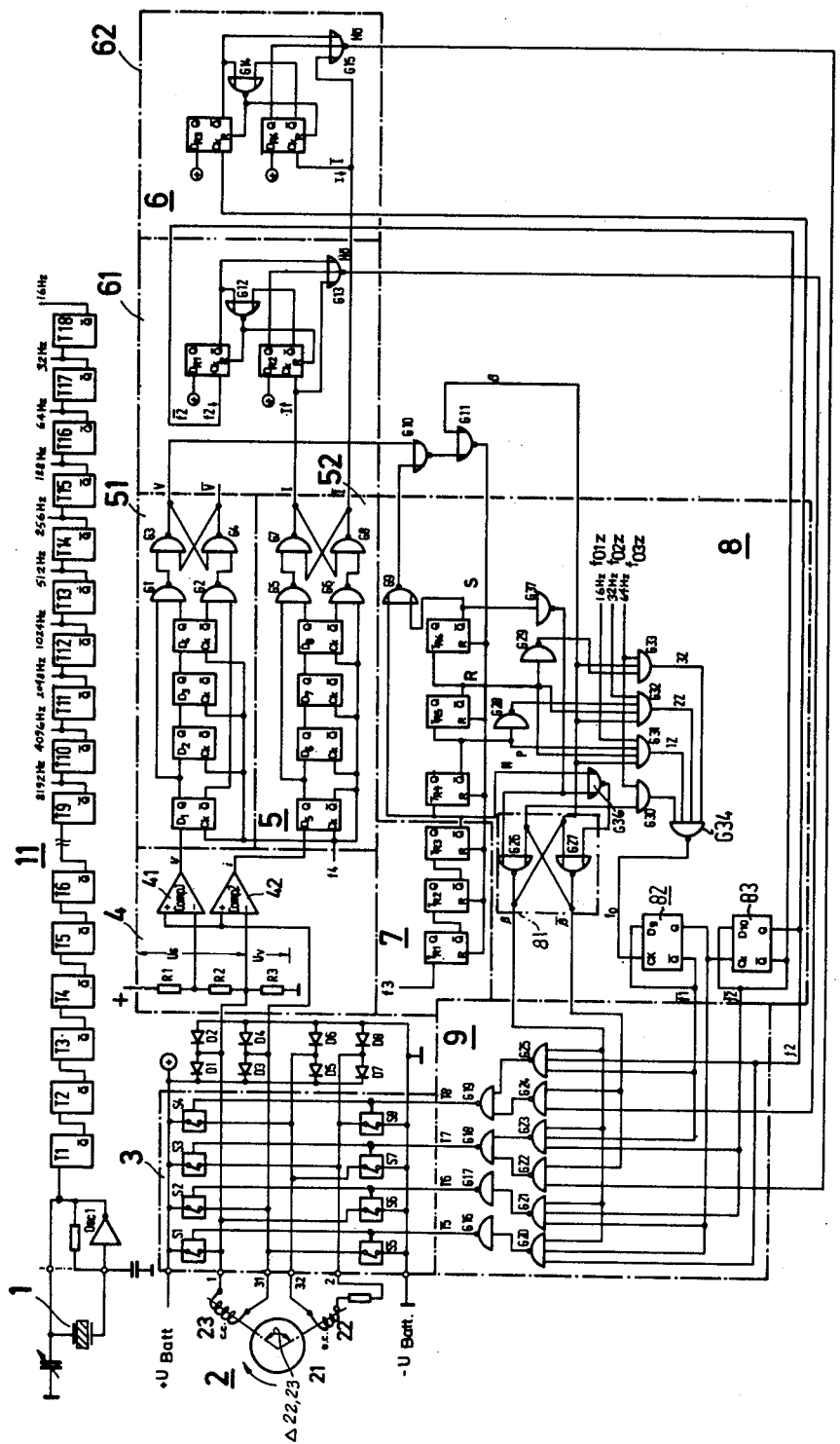
FIG. 2 is a schematic representation of individual control and regulation circuit elements, in accordance with this invention.

The detailed diagram of the control and regulation circuit arrangement, as can be seen in FIG. 2, shows the elements displayed in FIG. 1 in a dot-and-dash frame. The comparison element 4 contains first comparator 41 and second comparator 42, whose positive inputs are connected to one end of the second coil 23. While the negative input of the first comparator 41 is connected to a reference voltage $U_s$, the negative input of the second comparator 42 is connected to the other reference voltage $U_r$ and to the other end of the second coil 23. The outputs of the two comparators 41 and 42, with the signals v and i, are conducted separately to one of the two component stages 51 and 52 of the interference-suppression and delay stage 5. Each of the two component stages 51 and 52 contains four series-connected, pulsed flip-flops D1 through D4 and respectively D5 through D8, whose pulsing inputs $C_k$ have synchronously applied to them a specificable frequency $f_4$, in this case, a frequency of 1024 Hz. The input of the flip-flop D1 or D5, which is respectively pulsed first, is connected with the output of the first or second comparator 41 or respectively 42. The outputs Q of the pulsed flip-flops D1 through D3 or respectively D5 through D7 are always connected with the input of the subsequently pulsed flip-flops D2 through D4 or respectively D6 through D8. The output of the respectively last flip-flop D4 or D8 is connected to an input of the first NAND-gate G1 or respectively G5, which is connected after it. The output of the respectively first pulsed flip-flop D1 or respectively D5 is connected to the other input of this NAND-gate. The negated outputs $\overline{Q}$ of the first or respectively last pulsed flip-flop D1 or D4 and D5 or D8 are connected to the inputs of a second NAND-gate G2 or respectively G6.

The outputs of these two first NAND-gates G1, G2 or respectively G5, G6 are connected to the input of a third and respectively fourth NAND-gate G3, G4 and respectively G7, G8. The other input of these gates is always connected with the output of the respectively other NAND-gate G4, G3 and respectively G8, G7. The output signal V of the first interference-suppression and delay stage 51, which is identical with the output signal of the third NAND-gate G3, is connected to the input of the self-starting stage 8, which is connected after it. The output signals I, Ī of the second interference-suppression and delay stage 52, which are identical with the output signals of the third and fourth NAND-gate G7, G8 of this stage, are connected with the regulation device for nominal operation 6, which is connected after it.

The regulation device for nominal operation 6 likewise has two separate regulation devices 61 and 62 for the nominal running pulses Ho+, Ho−. Each of these regulation devices 61 and 62 contains two D-flip-flops $D_{R1}$, $D_{R2}$ and respectively $D_{R3}$, $D_{R4}$, two NOR-gates G12, G13 and respectively G14, G15, which are connected together in such a fashion that the negated outputs $\bar{Q}$ of the two D-flip-flops $D_{R1}$, $D_{R2}$ and $D_{R3}$, $D_{R4}$ are collected together through the first NOR-gate G12 or respectively G14, and are applied to the reset inputs of the two D-flip-flops $D_{R1}$, $D_{R2}$ and $D_{R3}$, $D_{R4}$. The negated output $\bar{Q}$ of the first D-flip-flop $D_{R1}$ or respectively $D_{R3}$ and the output of the second D-flip-flop $D_{R2}$ and respectively $D_{R4}$, together with the output signal I, Ī of the second interference-suppression and delay stage 52, are connected to the three inputs of the second NOR-gate G13 or respectively G15. The outputs of these two NOR-gates G13 or respectively G15 are connected with two inputs of the driving logic circuit 9.

The D-input of each of flip-flops $D_{R1}$ to $D_{R4}$ is connected to a positive voltage potential. The clock inputs $C_k$ of flip-flops $D_{R1}$ and $D_{R3}$ are supplied with signals $f_2$ and $\bar{f}_2$, respectively, output from self-starting stage 8. On the other hand, the clocked inputs $C_k$ of flip-flops $D_{R2}$ and $D_{R4}$ are supplied with signals I and Ī output from the second interference-suppression and delay stage 52.

Self-starting stage 8 includes three T-flip-flops $T_{R4}$, $T_{R5}$ and $T_{R6}$. The negated outputs $\bar{Q}$ of $T_{R4}$ and $T_{R5}$ emit signals designated respectively as P and R, which are supplied to the T-input of the next succeeding T-flip-flop. (i.e., Signal P is supplied to flip-flop $T_{R5}$, and signal R is supplied to flip-flop $T_{R6}$.) The negated output $\bar{Q}$ of flip-flop $T_{R6}$ is designated as signal S and is provided as one input to a NOR-gate G9.

The input of the first T-flip-flop TR4 is connected with the output of the waiting time element 7, which emits a signal N. The reset-inputs R of the three T-flip-flops TR4 through TR6 are jointly connected to the output of a circuit which consists of the three NOR-gates G9 through G11. The inputs of the first NOR-gate G9 have applied to them both the negated output $\bar{Q}$ of the third T-flip-flop $T_{R6}$ and the prescribable signal N that is emitted by the waiting time element 7. An input of the second NOR-gate G10 is connected with the output of the first NOR-gate 9, while the second input has applied to it the self-starting signal V, which is delivered by the first interference-suppression and delay stage 51.

The third NOR-gate G11 is connected with the output of the second NOR-gate G10 and it also has applied to it the switch-over signal $\beta$ that is emitted by the self-starting stage 8. Furthermore, four AND-gates G30 through G33 are provided in the self-starting stage 8. The prescribed frequency signals $f_{o1z}$, $f_{o2z}$, $f_{o3z}$, in the embodiment 16, 32 and 64 Hz, the output signals P and R, and, by means of two NAND-gates G28, G29, the negated outputs signals, $\bar{P}$, $\bar{R}$ of the first and second T-flip-flops $T_{R4}$ and $T_{R5}$, the switch-over signal $\beta$, and the negated switch-over signal $\bar{\beta}$ are applied to the inputs of the AND-gates G30 through G33 in the following fashion:

First gate G30: $\bar{\beta}$ (negated) and $f_{o3z}$ (64 Hz)
Second gate G31: $\beta$, P, R and $f_{o1z}$ (16 Hz)
Third gate G32: $\beta$, $\bar{P}$, R and $f_{o2z}$ (32 Hz)
Fourth gate G33: $\beta$, $\bar{R}$ and $f_{o3z}$ (64 Hz)

The outputs of the four AND-gates G30 through G33 are collected together through a NOR-gate G34. A pulse train $f_o$ is present at the output of the NOR-gate G34. The pulse train $f_o$ is applied to the pulsing input $C_k$ of the series-connected D-flip-flop 82. Together with a second D-flip-flop 83, the D-flip-flop 82 forms a frequency step-down stage. With the two D-flip-flops 82 and 83, the negated output $\bar{Q}$ is connected with the input D9 and D10. The output Q of the first D-flip-flop 82 is connected with the pulsing input of the second D-flip-flop 83. The step-down frequency train f1, f̄1 and f2, f̄2 are present at the outputs Q and at the negated outputs $\bar{Q}$ of the two D-flip-flops 82 and 83. The negated output signal $\bar{S}$ of the third T-flip-flop $T_{R6}$ and the output signal of another NOR-gate G36 are applied to the inputs of another T-flip-flop 81 of the self-starting stage 8. The negated output signal $\bar{S}$ and the signal N, which is emitted by the waiting time element 7, are collected together at the NOR-gate G36. The switch-over signal $\beta$ as well as the negated switch-over signal $\bar{\beta}$ are applied to the output of T-flip-flop 81. In the embodiment, the T-flip-flop 81 is composed of two NOR-gates G26 and G27.

In the embodiment, the waiting time element 7 consists of three delay stages TR1 through TR3, whose reset inputs, together with the reset inputs of the T-flip-flops of the self-starting stage 8, are connected to the output of the gate G11. A frequency f3, in the embodiment 16 Hz, is applied to the input of the first delay stage $T_{R1}$, while the outputs $\bar{Q}$ of the first and second delay stages TR1 and TR2 are connected with the inputs of the following delay stage, and the signal N is present at the output of the third delay stage TR3.

The output signals, $\beta$, $\bar{\beta}$, f1, f/1̄, f2, f/2̄ of the self-starting stage 8 and the output signals Ho− as well as Ho+ of the regulation device for the normal operation 6 are linked together in the series-connected driving logic circuit 9 by means of six AND-gates G20 through G25, whose outputs are connected to four other AND-gates G16 through G19, where this linkage is arranged in such a fashion that the said output signals satisfy the following truth table:

|  | Signals | | | | | | | Switches | | | |
|---|---|---|---|---|---|---|---|---|---|---|---|
| Operation | $\beta$ | $T_5$ | $T_6$ | $T_7$ | $T_8$ | $H_o^+$ | $H_o^-$ | S1/S5 | S2/S6 | S3/S7 | S4/S8 |
| Self-starting | H | H | L | L | L | — | — | E | A | A | A |
|  | H | L | L | L | H | — | — | A | A | A | E |

-continued

| Operation | Signals | | | | | | | Switches | | | |
|---|---|---|---|---|---|---|---|---|---|---|---|
| | β | T$_5$ | T$_6$ | T$_7$ | T$_8$ | H$_o$$^+$ | H$_o$$^-$ | S1/S5 | S2/S6 | S3/S7 | S4/S8 |
| | H | L | H | L | L | — | — | A | E | A | A |
| | H | L | L | H | L | — | — | A | A | E | A |
| Nominal-H$_o$$^+$ | L | L | L | H | L | H | L | A | A | E | A |
| Running Operation-H$_o$$^-$ | L | L | L | L | H | L | H | A | A | A | E |
| H$_o$$^+$ = H$_o$$^-$ | L | L | L | L | L | L | L | A | A | A | A | where
H = high potential
L = low potential
— = condition not significant
E = switch closed
A = switch open The outputs T5 through T8 of the NAND-elements G16 through G19 are used to drive eight switches S1 through S8 of a switching stage 3, whose switching connections are respectively connected in cyclic permutation to the positive or negative battery connection $+U_{BATT}$ and $-U_{BATT}$ as well as to one or the other coil end of the first or second coil 22 or 23 of the reactive motor 2. One output signal T5 through T8 always controls respectively two switches, which are connected to one or the other coil end of one of the two coils 22 or 23. The diodes D1 through D8 are arranged in the switching stage and are connected in parallel with the two coils 22 and 23, in such a fashion that the magnetic energy stored in the coils can be returned to the supply battery after the switches S1 through S8 are switched off.

The rotations of the motor rotor 21 are transmitted, through a shaft, to a transmission, and from the transmission, through another shaft, to the display system all as well known in the art. The display system, for example, operates an analog display with several pointers and with a number dial.

The mode of functioning of the process according to the invention and of the arrangement according to the invention will be explained below by means of the time plots of the individual signals in FIGS. 3 and 4.

Figure 3:
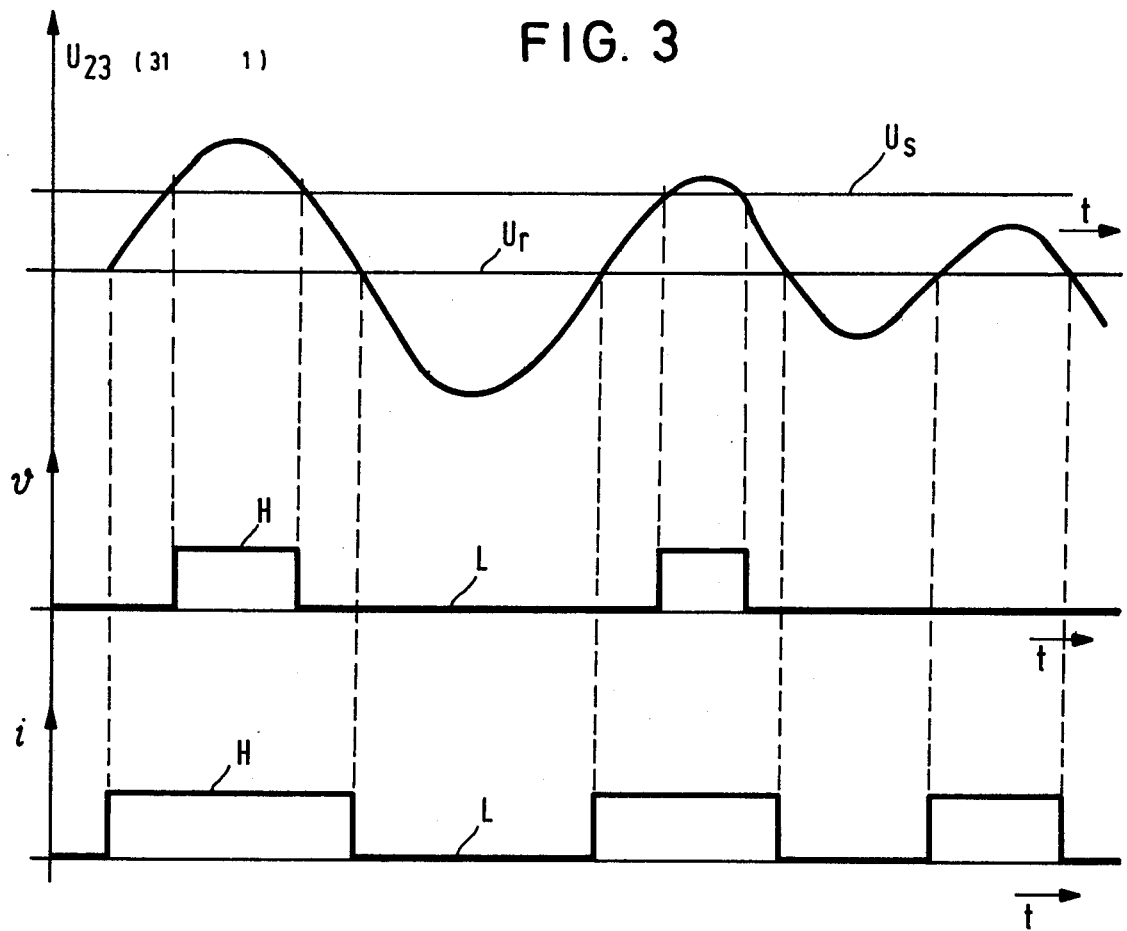
FIGS. 3, 4, and 5 are time displays of the pulses and signals according to FIGS. 1 and 2 of this invention.

FIG. 3 shows the time behavior of the voltages at the second coil 23, the constant reference voltages U$_r$ and U$_s$ as well as the output signals v and i from the two comparators 41 and 42. When the rotor 21 rotates, the magnetic lines of the poles N and S periodically cut the magnetic field lines of the second working coil 23. This generates a sinusoidal voltage U$_{23}$ with zero crossings, the so-called sensor signal. By comparison with the reference voltages U$_r$ and U$_s$ in the two comparators 41 and 42, which can also be designated as pulse shapers, the sensor signal is converted into rectangular pulses, whose vertical edges lie at the intersection points of the sensor signal with the reference voltages U$_r$ and U$_s$.

In regions where the sensor signal U$_{23}$ is larger than the reference voltage U$_r$ and U$_s$ respectively, a rectangular signal v and respectively i is emitted. The comparators 41 and 42 therefore digitize the sensor signal, so that the output signals v and i at the output of the two comparators 41 and 42 look as shown in FIG. 3. The signal v is H (for high potential) only when the sensor signal U$_{23}$ is larger than the reference voltage U$_s$. This can indicate, for example, that the rotor rotational speed has fallen below a speed that corresponds to the reference voltage U$_s$. This reference voltage, however, is also used as an increased interference-level spacing, so that possible interferences in the second coil 23, which are less than the reference voltage U$_s$, will not appear in the output signal v at the output of the first comparator 41. The digitized output signals v and i from the comparators 41 and 42 are applied to the inputs of the interference-suppression and delay stages 51 and 52, which are connected on the output side, and which operate on the basis of a time delay. Only for conditions (L) and (H), which last longer than a time interval Δt, will a change in the signal appear after the respective interference-suppression and delay stage 51 or 52 (V or respectively I), so that noise pulse peaks in the form L-H-L or H-L-H in the output signals v and i, which are shorter than the above-mentioned time interval T, cannot be transmitted through the respective interference-suppression and delay element 51 or 52. The interference-suppression and delay element 51 or respectively 52 at the same time acts as a delay element between the signals v and V or respectively i and I.

The delay between the input signals v and i of the interference-suppression and delay stages 51 and respectively 52 and the output signals V and I and respectively I offers advantages in the optimization of the control pulse setting with respect to the first coil 22 as well as for nominal running operation.

Figure 4:
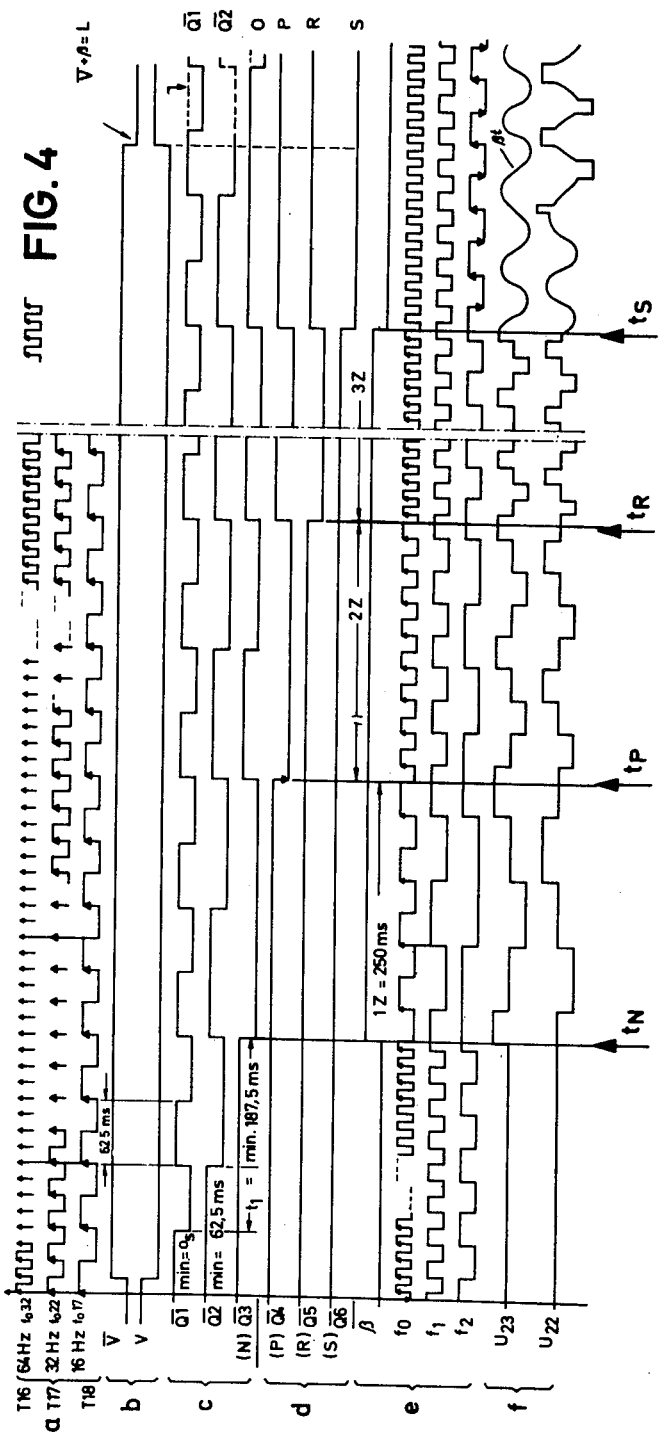

The following signals are shown in FIG. 4, from top to bottom:

(a) Three frequency signals f$_{o1z}$ through f$_{o3z}$, which are tapped from the frequency divider chain 11, which is connected at three different points on the output side of the quartz oscillator 1;

(b) the signals $\overline{V}$ and respectively the signal V, which is used as reset signal for the self-starting stage 8, and both of which are present at the output of the first interference-suppression and delay stage 51;

(c) the signals $\overline{Q1}$ through $\overline{Q3}$, which are present at the outputs of the T-flip-flops of the waiting time element 7, where the output signal $\overline{Q3}$ corresponds to the signal N from the third T-flip-flop;

(d) the output signals P, R, S from the three T-flip-flops of the self-starting stage 8;

(e) the switch-over signal β for initiating self-starting operation, the signal f$_o$ which is emitted by the NOR-gate G 34 of the self-starting stage 8, and the signals f$_1$ and f$_2$, which are emitted by the self-starting stage; and (f) the signals V$_{22}$ and V$_{23}$ at the coils 22 and 23 of the motor 2.

This time plot of the individual signals, in connection with the circuit arrangement of FIG. 2, indicates the following mode of functioning:

If the rotational speed of the rotor 21 of the motor 2 falls below a certain limit, so that the output signal V of the first interference-suppression and delay stage 51 no longer reaches H (for high potential) for a certain time interval, the joint reset input R of the T-flip-flops TR1 through TR6 of the waiting time element 7 and of the self-starting stage 8 remains at L (for low potential) during this time interval. It is here presupposed that, in normal operation, the switch-over signal β was (L) from the preceding condition, and that at least one of the two output signals N or S of the respectively third T-flip-flop TR3 or TR6 of the waiting time element 7 or respectively of the self-starting stage 8 was H. If the signal V remains in the state L during a time interval $t_1$, for example, because the rotor 21 of the motor 2 is no longer moving, the output N of the third T-flip-flop TR3 of the waiting time element 7 is put into the state L, and on its part flips the T-flip-flop 81, so that the switch-over signal β is put into state H, and the negated switch-over signal β is put into the state L. After β has become H, and as long as the switch-over signal remains in this state, the T-flip-flops TR-1 through TR6 are prevented from being set to null, since the output of NOR-gate 11, i.e. the reset signal for the T-flip-flops TR1 through TR6, remains in the state L because β=H. As long as the switch-over signal β remains in the state H, the self-starting operation will continue according to the principle of a stepping motor with two coils. During this time, the frequency signal $f_o$, which is emitted by the NOR-gate G 34 in the self-starting stage 8, assumes different values, depending on the time within the region where the switch-over signal β=H. The various regions 1Z, 2Z, and 3Z are generated from the applied frequency signals $f_{o1z}$-$f_{o3z}$, by means of the T-flip-flops TR4 through TR6 and the gates G 28 through G 34. Thus, the output signal $f_o$ in the region 1Z amounts, for example, to 16 hz, while in the region 2Z, it amounts to 32 Hz, and in the region 3Z, it amounts to 64 Hz. The time duration of these regions depends on the frequency $f_3$, which is applied to the first T-flip-flop TR 1 of the waiting time element 7, and on the number of T-flip-flops of the chain TR1 through TR6. The frequency $f_1$ or respectively $f_2$ is generated by means of the variable frequency $f_o$ in the series-connected frequency step-down stage formed by D-flip-flops 82 and 83. The frequencies $f_1$ and respectively $f_2$ have respectively half the frequency and a quarter of the frequency of the signal $f_o$ according to FIG. 4. The frequencies $f_1$ and $f_2$, together with the switch-over signal β or respectively the negated switch-over signal β, are applied to the series-connected driving logic circuit 9. There, by means of the NAND-gates G 16 - G 25, they drive the switches S1 through S8 of the switching element 3, in the region where the switch-over signal β=H, in such a fashion that the above-mentioned switching table is fulfilled for the switches S1-S8. This switching logic for the switches S1 through S8 has as its result the pulse train for the coils 22 and 23 of the motor 2, which is shown in FIG. 4f, whose frequency, for example, may be 4 hz in the region 1Z, 8 Hz in the region 2Z, and 16 Hz in the region 3Z. This self-starting control increases the rotational speed of the rotor 21, for example, from 0 to 8 revolutions per second, since the pulse train with a frequency of 16 Hz, and with a rotor having two pole pairs, will generate a rotational speed of 8 revolutions per second. The switch-over times are designated in the time plot of FIG. 4 by $t_N$ for the onset of self-starting operation, $t_P$ for switch-over from the first region 1Z to the second region 2Z, $t_R$ for the switch-over from the second region 2Z to the third region 3Z, and by $t_S$ for the switch-over from self-starting operation to nominal running operation.

If the output signal S of the third T-flip-flop TR6 of the self-starting stage 8 is put into the state L at the end of the third region 3Z, the flip-flop 81 is set to L with the switch-over β and is set to H with the negated switch-over signal β, which implies a change of the previous self-starting operation into nominal running operation. In nominal running operation, the second coil 23 of the motor 2 is used as a control coil or a pick-up coil, whose output signals lead to the signals V and I, as described above. During nominal running operation, the logic given in the switching table for switches S1 through S8 applies to the range β=L.

Figure 5:
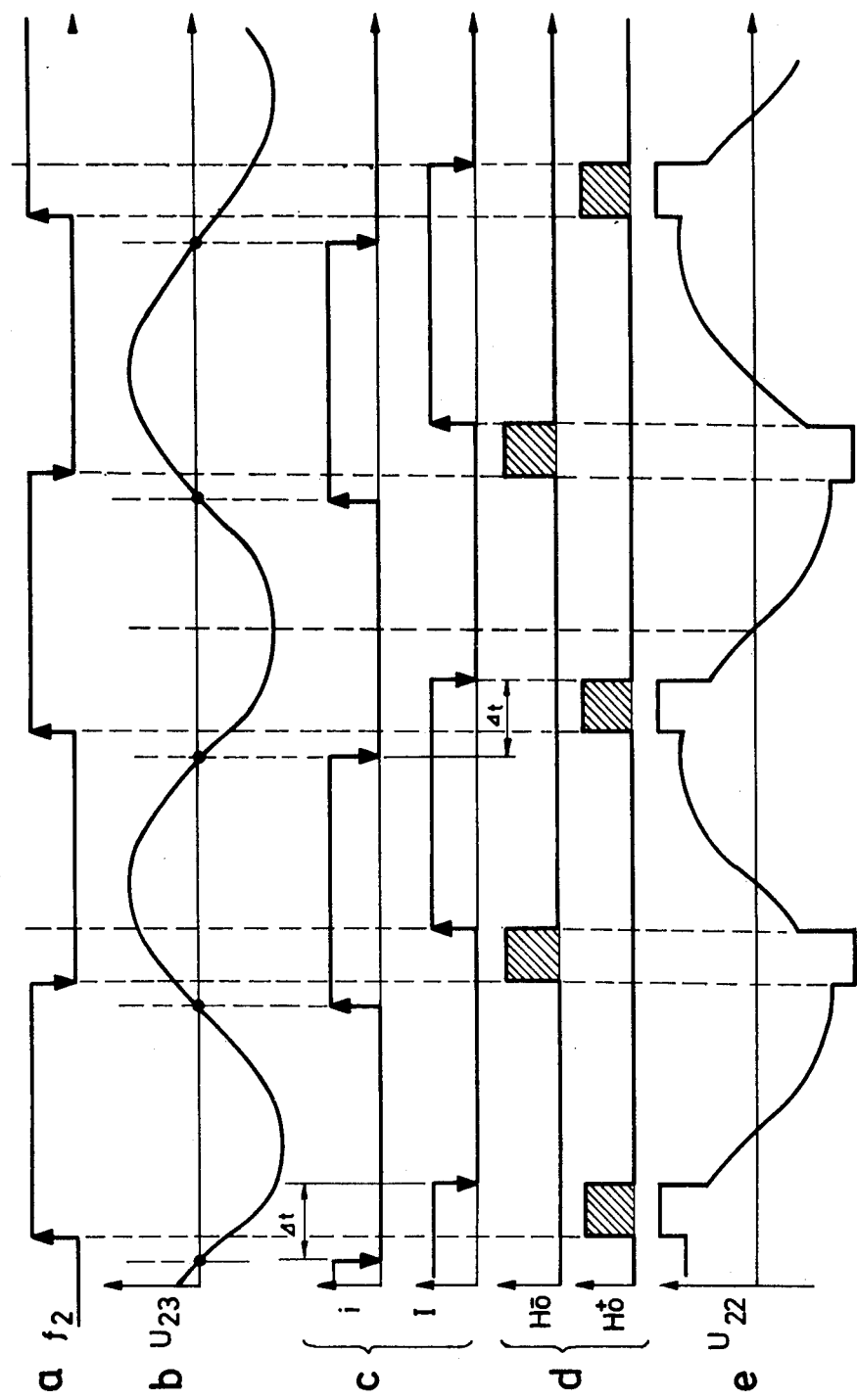

The regulation of nominal operation, connected below with the regulation device for nominal operation 61 and 62, as shown and described in FIG. 2, will be explained in more detail by means of the time plot in FIG. 5. The following signals, in their temporal dependence, are shown in FIG. 5, from top to bottom:

(a) The desired frequency $f_2$ which is emitted by the self-starting stage 8;
(b) the voltage $V_{23}$, which is tapped from the second coil 23, which now serves as a control coil (31 as against 1 in FIG. 2);
(c) the digitized voltage i, which is present at the output of the second comparator 42, as well as the signal I, which is derived therefrom, and which is present at the output of the second interference-suppression and delay stage 52, and which is shifted with respect to the signal i by the time interval Δt;
(d) the nominal running pulses Ho+, Ho−, which are present at the output of the nominal operation regulation devices 61 and 62; and
(e) the voltage curve for the first coil 22, where this voltage curve is formed by means of the driving logic circuit and a switching element, and where the coil 22 is used as the working coil in nominal operation.

This results in the following mode of functioning:

The switch-on time for the pulses depends on the phase shift between the desired frequency $f_2$, which is emitted by the self-starting stage 8, and the actual frequency (I-pulses) which are emitted by the second interference-suppression and delay stage 52. A nominal running pulse Ho− thus begins with the falling edge of the desired frequency $f_2$ and ends with the rising edge of the actual frequency I. This pulse is generated by means of the linkage of the two D-flip-flops $D_{R1}$ and $D_{R2}$, which has already been described, as well as by means of the two NOR-gates G12 and G13. This nominal running pulse Ho− switches on the two switches S4 and S8 of the switching element through the gates G24 and G19. The second nominal running pulse Ho+ begins with the rising edge of the desired frequency $f_2$ and ends with the falling edge of the actual frequency I. It is generated by means of the two D-flip-flops $D_{R3}$ and $D_{R4}$ as well as by means of the two NOR-gates G14 and G15. This nominal running pulse Ho+ switches the switches S3 and S7 of the switching element, in nominal running operation, through the two gates G22 and G18 of the driving logic circuit. The voltage shown in FIG. 4, is generated by the alternate switching of these two pairs of switches. This voltage is applied to the first coil 22. As already mentioned, the width of the pulses for the working coil 22 is determined by the phase shift between the desired frequency $f_2$ and the actual frequency I. On the other hand, the position of the pulses for the working coil is determined by the time delay Δt, which depends on the second interference suppression and delay stage 52 via the number of D-flip-flops.

If, for any reason, the rotor 21 has not reached the required speed for nominal running operation at the end of the self-starting operation, the self-starting operation is repeated. Since the output signal V of the first interference-suppression and delay stage 51 continues in the stage L if the nominal rotation speed has not been reached, the linkage of the output signals N and S of the respectively third T-flip-flops TR3 and TR6 of the waiting time element 7 and of the self-starting stage 8, both of which are in state L, takes care of a signal at the output of gate G9, which leads to a reset signal, via the two gates G10 and G11, for the T-flip-flop chain TR1 through TR6, so that the self-starting operation can repeat.

As shown in FIG. 2, the two coils 22 and 23 of the reactive motor 2 comprise an electrical angle $\Delta_{22, 23}$ between them. This angle satisfies the following equation:

$$\Delta_{22, 23} = K \cdot (\pi/2) - \rho_1$$

with $K = 1, 3, 5$ and $\rho_1 = (0 \ldots 0.4) \cdot \pi$.

For example, for $K = 3$ and $\rho_1 = 0.27$ the resulting angle $\Delta_{22, 23}$ is $$\Delta\, 22, 23 = 3 \cdot \frac{\pi}{2} - 0.27 \cdot \pi$$
$$= 3 \cdot 90° - 0.27 \cdot 180°$$
$$= 270° - 48.6°$$
$$\Delta\, 22, 23 = 221, 4° \text{ el.}$$

which means a geometric displacement of about 110° for a rotor with one pole pair.

Figure 6:
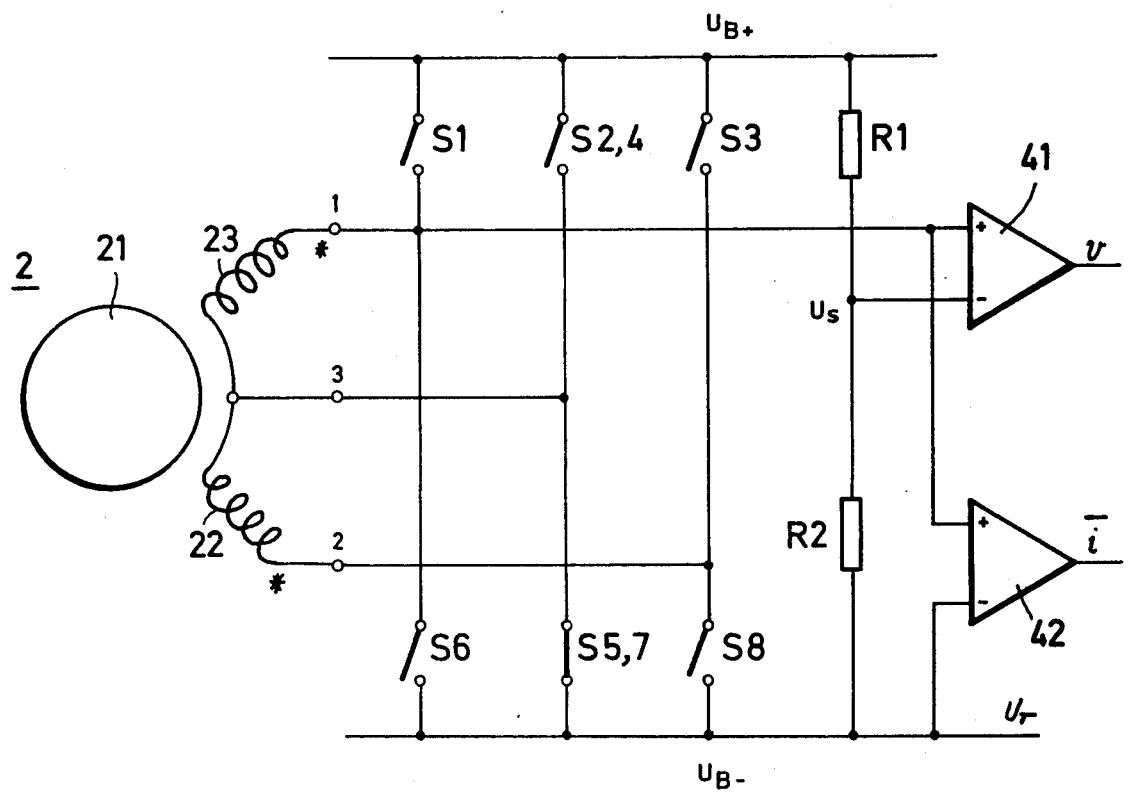
FIG. 6 is a simplified coil arrangement of a reactive motor, in accordance with this invention.

A variant of the solution with two separate coils 22 and 23 of the reactive motor 2 is shown in FIG. 6. It consists of two coils with three connections for the two coils 22 and 23. In this arrangement, two ends of the two coils 22 and 23 are connected together, so that two switches of the switching element 3 and the corresponding NAND-gates of the driving logic circuit can be omitted. This has been accounted for in FIG. 6 by the two switches S2 and S4 being combined into one switch S2, 4 and by the two switches S5 and S7 being combined into one switch S5, 7. In addition, the end of the coil 22 with terminal 3 is continuously connected during nominal operation with the minus pole of the power supply $U_{B-}$. This has been taken into account by the switch S5, 7 remaining closed. To sense and to digitize the rotational speed of the reactive motor 2, one end of the coil 23 is connected with the positive inputs of the two comparators 41 and 42, whose negative inputs are connected, on the one hand (comparator 42), with the minus pole of the power supply $U_{B-}$ and, on the other hand (comparator 41), with a reference voltage $U_S$.

Figure 7:
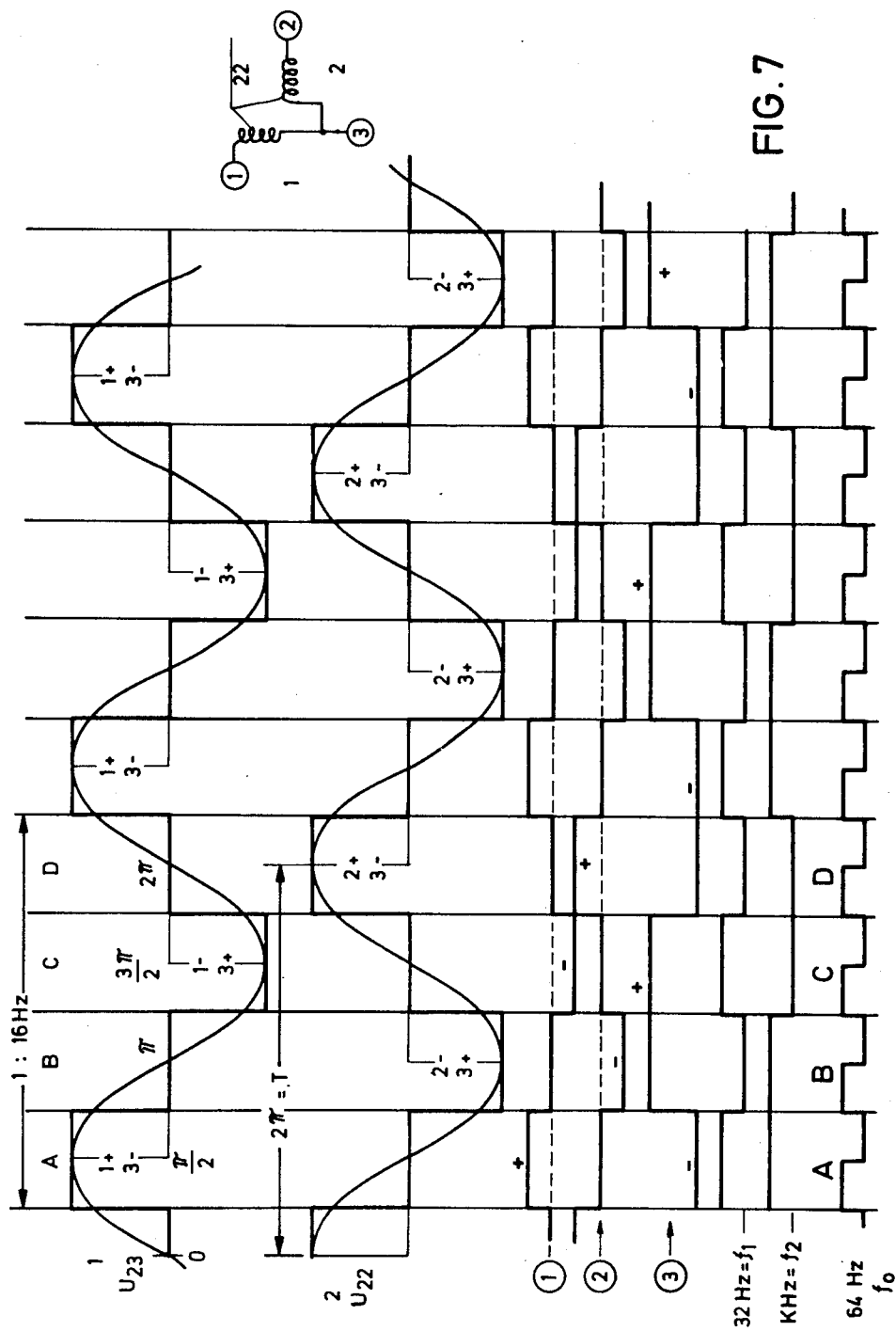
FIG. 7 is a time plot of the pulses and signals when the simplified coil arrangement of FIG. 6 is used, in accordance with this invention.

The mode of functioning of this arrangement is seen in connection with the time plot of the signals in FIG. 7, as follows:

FIG. 7 illustrates: (a) the voltages at the coils 1 and 2; (b) the signals at the coil ends 1, 2 and 3; and (c) the output signals $f_1$, $f_2$ and $f_o$ of the self-starting stage.

In self-starting operation, the resulting signal frequency is $f_o$, as shown in FIG. 7. From this, the other two frequencies $f_1$ and $f_2$ are derived, as described above. Referring to the switching table that has already been described above, a switching table results for this simplified variant, which corresponds to the above-mentioned one, with the specification that the joint switches S2, 4 and S5, 7 are always switched on in self-starting operation when one of the two switches S2, 4 or respectively S5, 7 is switched on.

In nominal running operation, the common terminal 3 of the two coils 22 and 23 is constantly connected to the minus pole of the power supply $U_{B-}$ through the closed switch S5, 7. The terminal 1 of the second coil 23 is constantly connected with the positive inputs of the comparators 41 and 42 through the opened switches S1 and S6. In this arrangement, the switch S3 is switched on and off synchronously with the nominal running signal Ho+ which is emitted by the nominal running regulation device 62. The second nominal running signal Ho− is no longer used in this variant, since the first coil 22 can no longer be repoled.

Consequently, simplifications result with this variant, so that, in place of four coil terminals, only three terminals are required, and in place of eight switches only six switches are required, and in place of three resistors to generate the reference voltage only two resistors are required, and for freerunning operation, six diodes are required in place of eight diodes.

Figure 8:
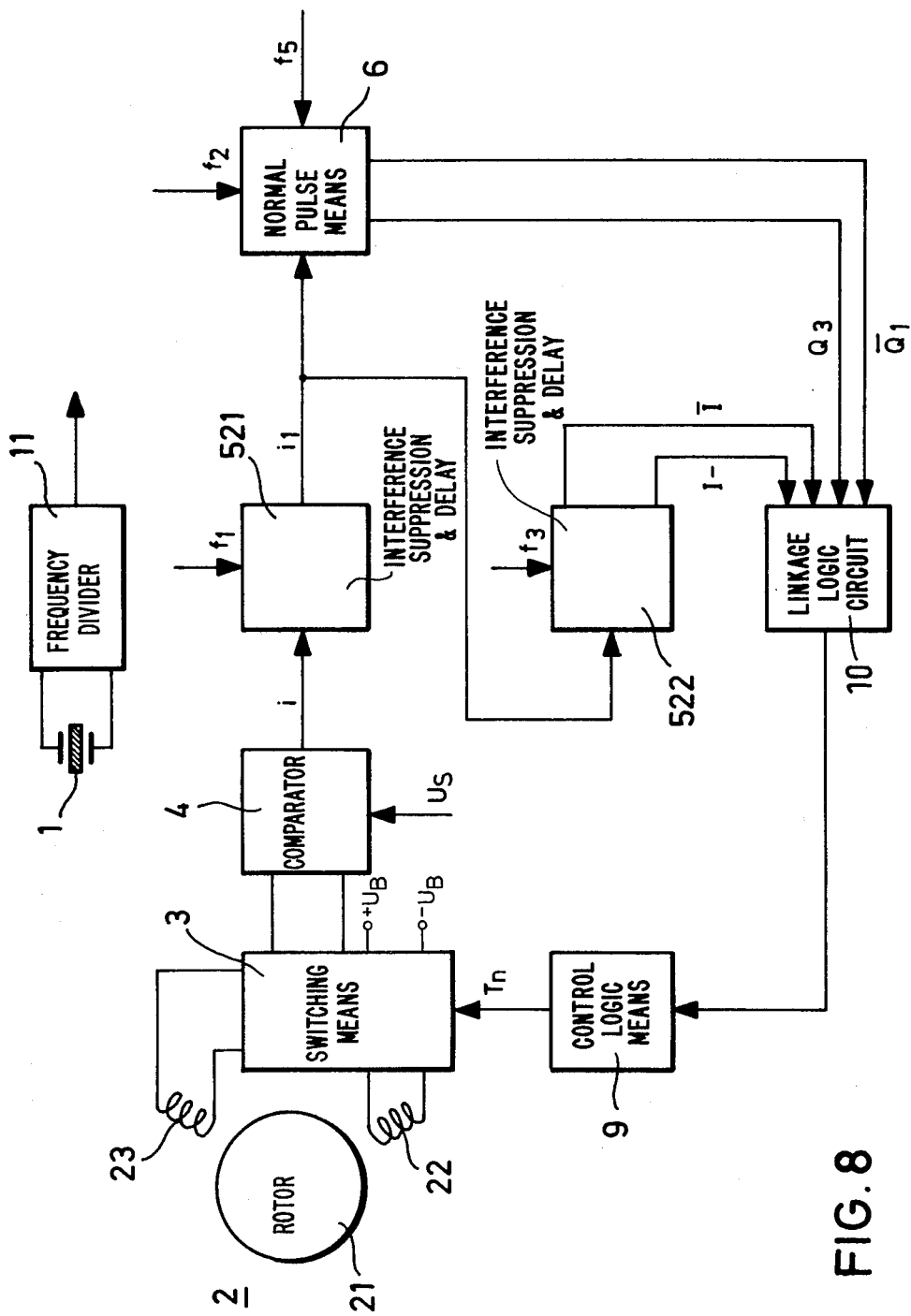
FIG. 8 is a block circuit diagram of the control and regulation arrangement for the reactive motor with self-starting and with especially low power consumption, in accordance with this invention.

FIG. 8 schematically shows a reactive motor 2, which has a rotor 21 with poles formed of permanent magnets and a stator with two coils 22, 23, where said stator is not shown in more detail. If one of the two coils 22, 23 has pulses applied to it, the rotor 21 can be brought to a rotational speed that corresponds to the number of pole pairs and to the frequency. The rotations of the rotor 21 are transmitted through a shaft and through a transmission to a display system, for application in time-keeping devices, for example clocks. This makes it possible, for example, to have an analog display by means of several pointers and a number dial.

To sense the rotational speed n and consequently the actual frequency, one uses the control coil 23 of the stator as a sensor coil to emit a voltage $U_n$, proportional to the rotational speed, for regulating said rotational speed. This control coil 23, just like the working coil 22, lies within the range of influence of the magnetic lines of the poles of the rotor 21. When the rotor 21 rotates, the magnetic field lines of the poles periodically cut through the sensor coil 23. As a result, a sinusoidal voltage $U_n$, proportional to the rotational speed n and consequently to the actual frequency of the rotor 21, is present at the ends of the coil. The voltage $U_n$ has zero crossings, and is the so-called sensor signal. This voltage $U_n$, which is proporational to the rotational speed, together with a comparison voltage $U_s$, is applied to the inputs of a comparison element 4. Here, the sensor signal is converted into rectangular pulses for regulating the rotational speed. The vertical edges of the rectangular pulses lie at the interfaces with the constant comparison voltage $U_s$. The output signal i of the comparison element 4 is essentially rectangular and corresponds to the actual frequency. It is applied to the input of a series-connected interference-suppression element 521. The interference-suppression element 521 additionally has applied to it a first pulsing frequency $f_1$. The interference-suppression element 521 is constructed in the form of a divider chain on which a pulsing frequency $f_1$ is impressed. The interference suppression element 521 is supposed to eliminate erroneous signals, which are not useful signals of the actual frequency. This interference-suppression element 521 delivers interference-free signals $i_1$ both to a phase comparator 6, to which a second pulsing frequency is applied, and to a delay element 522, to which a third pulsing frequency $f_3$ is applied. The design frequency $f_s$, which is required for the phase comparison, is applied to the phase comparator 6 at another input. The pulse trains Q1 and respectively Q3, for accelerating or respectively braking the reactive motor 2, are present in the output of the phase comparator 6.

The delay element 522 is likewise constructed in the form of a divider chain, on which the third pulsing frequency $f_3$ is impressed. At its outputs, it delivers signals I and $\bar{I}$ which are delayed with respect to the interference-free actual-frequency signal $i_1$. The output signals I, $\bar{I}$; $Q_1$, $Q_3$ of the delay element 522 or respectively of the phase comparator 6 are applied to the inputs of a linkage logic circuit 10, which emits pulse sequences at its output, by the logical linkage of the input signals, through a gate circuit. These pulse sequences are connected with a switching stage 3, through a series-connected driving logic circuit 9, which likewise can be constructed from a certain number of gates. Both the supply voltage $\pm U_B$ and the control and working coils 22, 23 of the reactive motor 2 are connected to the switching stage 3. Controlled by the pulse sequences $T_n$, which are present at the output of the driving logic circuit 9, the switching stage 3 connects the coils 22, 23 of the reactive motor 2 with one or the other pole of the voltage source $+U_B$, $-U_B$.

A generator is associated with the entire arrangement. This generator has a quartz oscillator 1 and a frequency divider 11. Rectangular pulses with frequencies $f_s$, $f_1$-$f_3$ are present there, which are conducted to the component described above as pulsing frequencies.

Figure 9:
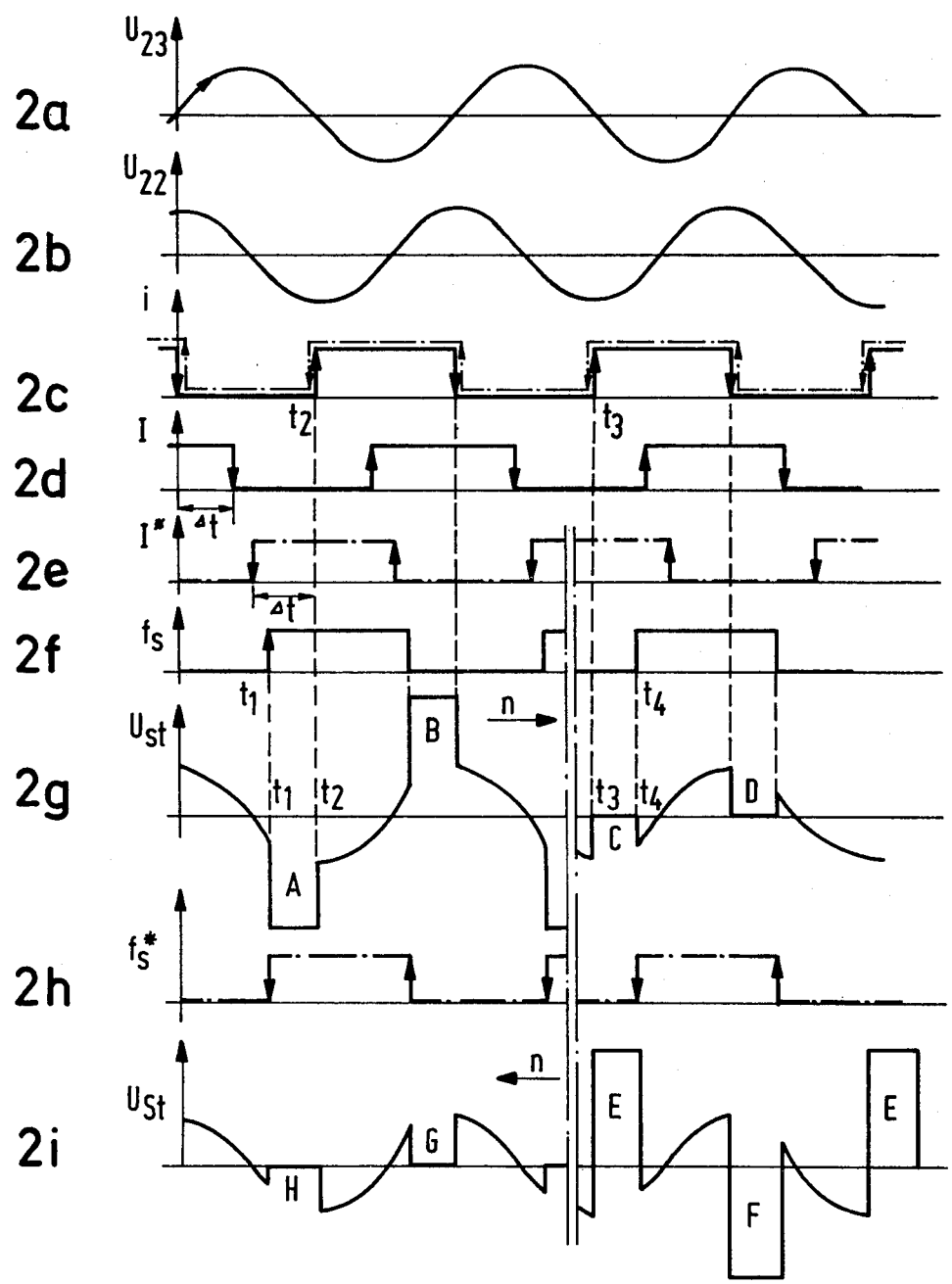
FIG. 9 is a time plot of the pulses and signals when using an arrangement according to FIG. 8 of this invention.

The mode of functioning of the arrangement according to FIG. 8 and consequently the mode of functioning of the process according to the invention will subsequently be explained by way of the time plot of individual signals in FIG. 9.

The sinusoidal voltages shown in FIGS. 9a and b represent the voltages at the control coil $U_{23}$ and at the working coil $U_{22}$, which are electrically displaced with respect to one another by 90°. By means of the comparison element 4, and by means of the adjusted reference voltage $U_s$, a rectangular output voltage i is generated (FIG. 9c). The correct sense of rotation of the rotor 21 and consequently of the control coil voltage $U_{23}$ has here been shown by a solid line, and the sense of rotation that is opposite to the correct one has been shown by a dash-dot line. This rectangular output signal i of the comparison element 4 is freed from noise signals by means of the interference-suppression element 521. It is conducted to the series-connected delay element 522, as the signal $i_1$. The output signal I of the delay element 522 is shown in FIG. 9d. With respect to the rising or respectively the falling edge of the actual frequency signal i, the signal I is delayed by a time $\Delta t$. In FIG. 9e, this signal, delayed by a time $\Delta t$, is shown as the signal I* for the sense of rotation opposite to the correct sense of rotation.

FIG. 9f shows the rectangular desired-frequency signals $f_s$, the frequency of which is determined by the internal reference clock, i.e., crystal oscillator 1. As can be seen from this time plot, the rising edge of the desired frequency $f_s$ at time $t_1$ occurs before the rising edge of the actual-frequency signal i at the time $t_2$, in the correct sense of rotation. In this time range, between the time $t_1$ and $t_2$, i.e. beginning with the rising edge of the desired frequency $f_s$ and ending with the rising edge of the actual frequency signal i in the negative half-wave region and beginning with the falling edge of the desired frequency signal $f_2$, and ending with the falling edge of the actual frequency signal i in the positive half-wave region, the working coil 22 receives accelerating pulses. These accelerating pulses, which are shown in FIG. 9g as pulses A and B, are applied to the working coil 22, however, only if the delay signal I=low in the negative half-wave region, or respectively if the delayed actual frequency signal I=high in the positive half-wave region. If the delayed actual frequency signal I were to rise or fall within the time region which lies between the rising or respectively falling edges of the desired frequency signal $f_s$ and the actual frequency signal i, the accelerating pulse A or respectively B would decline in correspondence with the rising or respectively falling edge of the delayed actual frequency signal I.

If the actual frequency signal i leads the desired frequency signal $f_s$, i.e. if the rising edge of the actual frequency signal i, at the time $t_3$ occurs before the rising edge of the desired frequency signal $f_s$ at the time $t_4$, the rotor 21 of the reactive motor 2 is braked by the short-circuiting of the working coil 22. This short-circuiting of the working coil 22 takes place with the rising edge of the actual frequency signal i and ends with the rising edge of the desired frequency signal $f_s$ (region C) and/or with the falling edge of the actual frequency signal i and the falling edge of the desired frequency signal $f_s$ (region D).

In the time plots of FIGS. 9h and i, the circumstances are shown which occur when the sense of rotation of the rotor 21 is opposite to the correct sense of rotation. For the sake of better understanding, the behavior of the desired frequency signal $f_s$ must merely be regarded from right to left, i.e. in the direction of the drawn-in arrow. Since the position of the desired frequency signal $f_s$ does not change with respect to the correct sense of rotation, pulses are generated in the region where the desired frequency signal $f_s$ leads the actual frequency signal i, through the linkage of the actual frequency signal I* which is shown delayed in FIG. 9e, for the opposite sense of rotation in the regions E and F (FIG. 9i). These pulses appear as accelerating pulses, but they brake the rotor 21 since they are supposed to accelerate only in the correct sense of rotation. This effect is achieved by using the actual frequency signals i as control pulses and by limiting the actual frequency signals i through the regions of the delayed actual frequency signal I*.

If, subsequently, the actual frequency signal i occurs before the desired frequency signal $f_s$, the braking pulses G and H are generated by short-circuiting the working coil 22. These likewise brake the rotor 21, so that the sense of rotation opposite to the correct sense of rotation is no longer possible.

Figure 10:
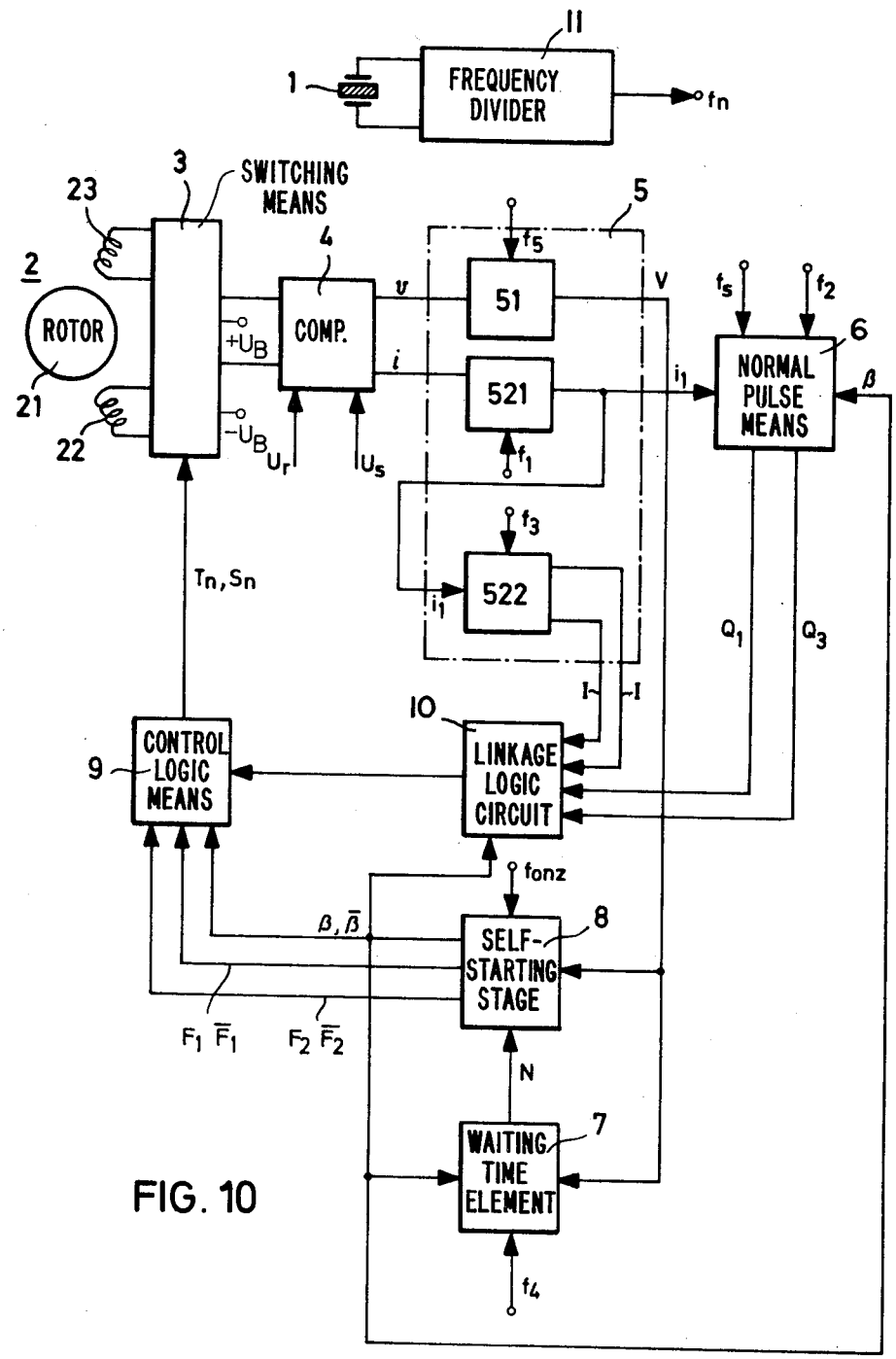
FIG. 10 is a block circuit diagram of a modified control and regulation arrangement for a reactive motor with self-starting, in accordance with this invention.

FIG. 10 shows a block circuit diagram of an exemplary embodiment with a self-starting motor. This embodiment has the reactive motor 2, which comprises a rotor 21, with poles formed by permanent magnets, and a stator with the two windings 22 and 23, where this stator is not shown in more detail. Analogous to the arrangement according to FIG. 1, the control coil 23 is connected with a comparison element in order to sense the rotational speed n and to deliver a voltage $U_n$, proportional to said rotational speed, to control the rotational speed, and respectively as a criterion to initiate self-starting operation. Two comparison voltages $U_r$ and $U_s$ are applied to the comparison element. These comparison voltages convert the sinusoidal signal, which is tapped at the control coil, into two rectangular pulses for regulating the rotational speed and respectively for initiating self-starting operation. The vertical edges of the rectangular signals lie at the interfaces with the constant comparison voltages $U_r$ and $U_s$. The output signals v and i of the comparison element 4 are essentially rectangular and are applied to the input of a series-connected interference-suppression and delay element 51 for the output signal v and respectively an interference-suppression element 521 for the signal i. The interference-suppression and delay element 51 for the output signal v has impressed on it a pulsing frequency $f_5$, while the interference-suppression 521 for the output signal i has impressed on it a pulsing frequency $f_1$. The interference-free output signal i, as the actual frequency signal $i_1$, is applied both to a series-connected phase comparator 6 and to a delay element 522.

The delay element 522 has impressed on it a third pulsing frequency $f_3$. At its outputs, it delivers interference-free and delayed actual frequency signals I and respectively negated signals $\bar{I}$. The interference-suppression and delay elements 51, 521, and 522 for the output signals v and i are, in this embodiment, collected together to a common interference-suppression and delay element 5, shown by dots and dashes.

The phase comparator 6 has applied to it not only the interference-free actual frequency signal $i_1$, but also a second pulsing frequency $f_2$ and a desired frequency signal $f_s$, which is necessary for the phase comparison, as well as a switch-over signal $\beta$. The outputs of the delay element 522 and of the phase comparator 6 as well as the switch-over signal $\beta$ are connected with the inputs of the linkage element 10. In a manner that has already been described above, the linkage element 10 delivers braking or respectively accelerating signals at its output to a driving logic circuit 9.

In addition to the interference-free and delayed self-starting signal V, which is emitted by the interference-suppression and delay stage 51, one or more frequency signals $f_{onz}$ which differ from one another, as well as a prescribable signal N, are additionally inputted into the self-starting stage 8. The prescribable signal N is generated in a waiting time element 7, which consists of one or more delay stages and to which a fourth pulsing frequency $f_4$ is inputted. The reset inputs of all delay stages of the waiting time element 7 are reset synchronously, in dependence on the self-starting signal V, which is likewise inputted, and which is noise-free and delayed, and in dependence on the switch-over signal.

From the self-starting stage 8, the following signals are conducted to the driving logic circuit 9, which is connected on the output side: The switch-over signal $\beta$ or respectively the negated switch-over signal $\bar{\beta}$, two pulse trains $F_1$ or respectively $\bar{F}_1$, also $F_2$ or respectively $\bar{F}_2$, together with the output signal of the linkage logic circuit 10. Driving logic circuit 9 outputs pulse trains Tn, Sn which are provided to switching stage 3 which is electrically interposed between the voltage terminals $+U_B$, $-U_B$ and the coils 22 and 23 of the reactive motor 2. The switching stage 3 here connects the working coil 22 of the reactive motor 2, or respectively in self-starting operation, both the working coil 22 and the control winding 23 of the reactive motor 2, with one or the other pole of the voltage source $+U_B$ or respectively $-U_B$.

Analogous to the arrangement according to FIG. 8, a generator is also associated with this arrangement. This generator has a quartz oscillator 1 and a frequency divider 11. Rectangular pulses with the pulsing frequencies $f_1$–$f_5$ and the frequencies $f_{onz}$ and the frequency $f_s$ for the design frequency signal are present thereat, and are conducted at the abovementioned points to the corresponding components in the arrangement.

Figure 11:
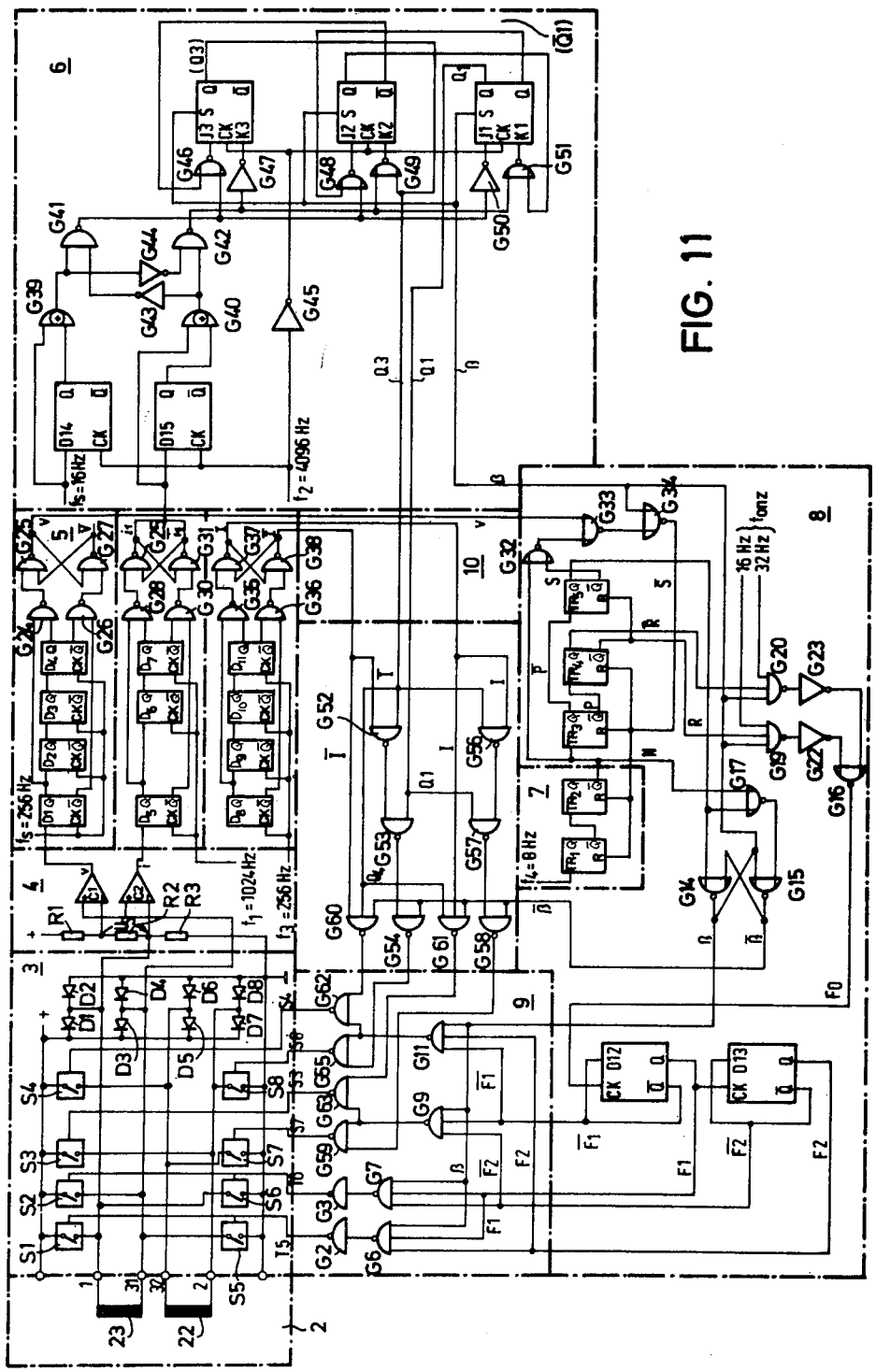
FIG. 11 is a schematic circuit diagram of control and regulation arrangement for a reactive motor with self-starting according to FIG. 10 of this invention.

The detailed representation of the control and regulation circuit arrangement, which is to be taken from FIG. 11, has the elements that are shown in a dot-and-dash frame FIG. 2.

The comparison element 4 contains two comparators 41 and 42, whose positive inputs are connected to one end of the control coil 23. While the negative input of the first comparator 41 is connected to one reference voltage $U_s$, the negative input of the second comparator 42 is connected to the other reference voltage $U_r$ and to the other end of the control coil 23. The reference voltages $U_r$ and respectively $U_s$ are tapped at a resistance divider with the resistors R1 through R3.

The outputs of the two comparators 41 and 42, with the output signals v and i, are separately conducted to an interference-suppression and delay stage 51 or respectively to the interference-suppression stage 521. The interference-suppression and delay stage 51 contains four series-connected, pulsed flip-flops D1–D4, whose pulse inputs $C_k$ have synchronously impressed on them a specifiable fifth pulsing frequency $f_5$, in this case a frequency of 256 Hz. The input of the first pulsed flip-flop D1 is connected with the output of the first comparator 41. The outputs Q of the pulsed flip-flops D1–D3 are respectively connected with the input of the next following pulsed flip-flops D2–D4. The output of the last flip-flop D4 is connected to the input of a series-connected first NAND-gate G24. The other input of this NAND-gate is connected to the output of the respectively first pulsed flip-flop D1. The negated outputs $\bar{Q}$ of the first or respectively last pulsed flip-flop D1 or respectively D4 are connected to the inputs of the second NAND-gate G26.

The interference-suppression element 521 contains three series-connected pulsed flip-flops D5–D7, and a first pulsing frequency $f_1$, in this case a frequency of 1024 Hz, is applied to the pulsing input $C_k$ of the aforementioned flip-flops. Corresponding to the interference-suppression and delay stage 51, the input of the first pulsed flip-flop D5 is connected with the output of the second comparator 42 and therefore with the actual frequency signal i. The outputs Q of the pulsed flip-flops D5 and D6 are respectively connected with the input of the next following pulsed flip-flop D6 and respectively D7. The output of the last flip-flop D7 is connected to the input of a series-connected first NAND-gate G28. The output of the first pulsed flip-flop D5 is connected to the other input of said NAND-gate G28. The negated outputs $\bar{Q}$ of the first and last pulsed flip-flops D5 and D7 are connected to the input of a second NAND-gate G30.

The delay element 522 for the interference-free actual-frequency signal $i_1$ is constructed analogously to the interference-suppression and delay stage 51, and contains the pulsed flip-flops D8–D11 whose pulsing inputs $C_k$ have applied to them synchronously a third pulsing frequency $f_3$, in this case a frequency of 256 Hz. The following arrangement is common to all three elements 51, 521, and 522: The outputs of the first two NAND-gates G24, G26, G28, G30, and G35, G36 are connected with the input of a third and respectively fourth NAND-gate G25, G27, G29, G31 and respectively G37, G38, whose other input is always connected with the output of the respectively other NAND-gate G25 or respectively G27, G29 or respectively G31, G37 or respectively G38. The output signal V of the interference-suppression and delay stage 51, which is identical with the output signal of the NAND-gate G25, is connected through the input of the series-connected self-starting stage 8. The noise-free actual-frequency signal $i_1$, which is identical with the output signal of the NAND-gate G29, as already described, is connected both to the input of the phase comparator 6 and to the input of the delay stage 522. The interference-free and delayed output signals I and $\bar{I}$, which are delivered the NAND-gates G37 and G38, are applied to the inputs of the linkage logic circuit 10, which is connected in series on the load side.

The phase comparator 6 contains two pulsed flip-flops D14, D15, whose pulsing inputs $C_k$ have applied to them a second pulsing frequency $f_s$ of 4096 Hz. The input of the first pulsed flip-flop D14 has applied to it the desired-frequency signal $f_s$, for example 16 Hz, while the input of the second pulsed flip-flop has applied to it the noise-free actual-frequency signal $i_1$. The outputs Q of the two pulsed flip-flops D14 and D15 are connected with one input of one exclusive OR-gate G39 and G40, where said OR-gates are connected in series on the load side. The other inputs on these OR-gates have applied to them the desired-frequency signal $f_s$ or respectively the noise-free actual-frequency signal $i_1$. The outputs of the two exclusive OR-gates G39, G40 are connected to one input each of one NAND-gate G41 and respectively G42, where said NAND-gates are connected in series on the load side. They are also connected, through an inverter G43 and respectively G44 to the other input of the respectively other NAND-gate G42 and respectively G41. The outputs of these two NAND-gates G41 and G42, together with the second pulsing frequency $f_2$, which is conducted over an inverter G45 and the switch-over signal $\beta$ are conducted to a shift register. This shift register comprises three J/K flip-flops J1–J3 as well as OR-gates G46, G48, G49, G51 as well as two other inverters G47 and G50. The set-inputs S of the J/K flip-flops J1–J3 have applied to them the switch-over signal $\beta$, while the pulsing inputs $C_k$ of the flip-flops are connected the inverted pulsing frequency $f_2$. The J-inputs of the J/K flip-flops J1–J3 are connected to the outputs of the OR-gates G46, G48 or respectively to the output of the inverter G50. The two OR-gates G46 and G48, and the inverter G50, are connected to the output of the first NAND-gate G41. The two other inputs of the OR-gates G46 and G48 are connected to the negated outputs $\bar{Q}$ of the second J/K flip-flop J2 or respectively the first J/K flip-flop J1. The K inputs of the three J/K flip-flops J1–J3 are connected in cyclic permutation with the outputs of an inverter G47 or respectively with the outputs of two OR-gates G49 and respectively G51. One input each of the two OR-gates G49 and G51 as well as the input of the inverter G47 are connected to the output of the second NAND-gate G42. The two other inputs of the OR-gates G49 and G50 are connected with the outputs Q of the second or respectively third J/K flip-flops J2 and J3. The outputs Q1 and Q3 of the first or respectively third J/K flip-flop are conducted to the linkage logic circuit 10 for further signal processing.

The mode of functioning of the phase comparator 6 will be explained briefly below:

Two pulse trains are compared with one another by means of the two pulsed flip-flops D14 and D15, and exclusive OR-gates G39, G40, the inverters G43, G44, and the NAND-gates G41 and G42. One pulse train is derived from the desired-frequency signal $f_s$, and the other pulse train is derived from the noise-free actual-frequency signal $i_1$. Since both frequencies $f_s$ and $i_1$ are mutually phase-shifted in the normal case, signals are generated in dependence on the phase shift between the two frequencies, and these signals cause the acceleration or braking of the rotor 21 of the reactive motor 2, corresponding to the time plot of FIG. 2. The shift register is necessary in this embodiment, in order to store the phase shift between the desired-frequency signal $f_s$ and the actual-frequency signal $i_1$ after self-starting operation has been initiated. Of course, in place of the shift register, an ascending-descending counter can also be used. The number of J/K flip-flops in the shift register can be enlarged from the number three, which has been chosen in this embodiment, to n. In this way, the signals Q1 and Q3, which are emitted by the shift register to regulate the rotational speed, appear in the output of a chain, which comprises more than three J/K flip-flops. With a large number of J/K flip-flops, the memory capacity of the shift register for the position of the desired-frequency signals with respect to the position of the actual-frequency signals is increased. The output signals I, $\bar{I}$ as well as Q1, Q3 of the delay stage 522 or respectively of the phase comparator 6 as well as the negated switch-over signal $\beta$ and the outputs of the respectively preceding NAND-gates are connected to the inputs of the NAND-gate of the linkage logic circuit 10, in accord with the following listing:

(a) Gate G52: Signal $\bar{I}$ and Q3
(b) Gate G56: Signal I and Q3
(c) Gate G53: Output signal gate G52 and signal Q1
(d) Gate G57: Output signal gate G56 and signal Q1
(e) Gate G60: Signal $\bar{I}$, signal Q3, switch-over signal $\beta$
(f) Gate G54: Output signal of the gate G53 and switch-over signal $\beta$
(g) Gate G61: Signal Q3, signal I and switch-over signal $\beta$
(h) Gate G58: Output signal of the gate G57 and switch-over signal $\beta$ The output signals B, $F_1$, $\bar{F}_1$ and $F_2$, $\bar{F}_2$ of the self-starting stage 8, and the output signals of the linkage logic circuit 20, are logically collected together in the driving logic circuit 9 by means of 10 NAND-gates, where the driving logic circuit 9 is connected in series on the load side. The signals $F_2$, $F_1$ and the switch-over signal $\beta$ are applied to the inputs of a first NAND-gate G6. The switch-over signal $\beta$ and the signals $F_1$ and $\bar{F}_2$ are likewise applied to a second NAND-gate G7. A third NAND-gate G9 receives the signals $\bar{F}_2$, $\bar{F}_1$ as well as the switch-over signal $\beta$. The switch-over signal $\beta$, together with the signals $\bar{F}_1$ and $F_2$, is likewise conducted to a fourth NAND-gate G11. The output signals of the first two NAND-gates G6 and G7 are delivered over two inverters G2 and G3 to the switching stage 3 which is connected in series on the output side. The output signal of the third NAND-gate G9 is applied to one input each of two NAND-gates G59 and G63, which are connected in series on the output side, and whose other inputs are connected with the output signals of the NAND-gate G61 and G58 of the linkage logic circuit. The output signal of the NAND-gate G11 is applied to the input of two other NAND-gates G55 and G62, whose other inputs are connected with the two other output signals of the NAND-gates G60 and G54 of the linkage logic circuit 10.

The outputs T5, T6 and respectively S3, S4, S7 and S8 of the driving logic circuit are used to control the eight switches S1–S8 of the switching stage 3, whose switching connections are connected in cyclic permutation respectively to the positive or negative battery terminal $+U_B$ and $-U_B$, to one or the other end of the control and working coils 22 and 23 in self-starting operation or respectively to the working coil 22 in regulation operation of the reactive motor 2. One output signal T5, T6 or respectively S3, S4, S7 or S8 here always activates the switches, which are connected to one or the other battery pole and to one or the other end of one of the two coils 22 or 23. The diodes D1–D8 are arranged in the switching stage, and are connected in parallel with the two coils 22 and 23, in such a fashion that the magnetic energy stored in the coils 22 and 23 is delivered back to the supply battery after the switches S1–S8 turn off.

The revolutions of the motor rotor 21 are transmitted, by means well known in the art through a shaft that is not shown in more detail, to a transmission, and from the latter through a further shaft, to a display system, which, for example, makes possible an analog display by means of several pointers and a number dial.

The mode of functioning of the method according to the invention and of the arrangement according to the invention, in accord with this embodiment, will be explained briefly below.

When the rotor 21 of the reactive motor 2 rotates, the magnetic lines of the poles N and S periodically cut the magnetic field lines of the control coil 23. This generates a sinusoidal voltage with zero crossings, the so-called sensor signal. By comparison with the reference voltages $U_r$ and $U_s$ in the two comparators 41 and 42, which can also be designated as pulse shapers, the sensor signal is converted into rectangular pulses, whose vertical edges lie at the intersection points of the sensor signal with the reference voltages $U_r$ and $U_s$.

In the regions where the sensor signal is larger than the respective reference voltage $U_r$ or $U_s$, a rectangular signal v or respectively i is emitted. The comparators 41 and 42 consequently utilize the sensor signal, so that the output signals v and i at the output of the two comparators 41 and 42 are essentially rectangular. The signal v is H (for high potential) only when the sensor signal is greater than the reference voltage $U_s$. In this way, for example, the system reports when the rotational speed of the rotor falls below a rotational speed which corresponds to the reference voltage $U_s$. However, this reference voltage $U_s$ is also used as an increased noise-level spacing, so that possible disturbances in the control coil 23, which are smaller than the reference voltage $U_s$, do not appear in the output signal v at the output of the first comparator 41. The digitized output signals v and i of the comparators 41 and 42 are applied to the inputs of the interference-suppression and delay stage 51 or respectively to the inputs of the interference suppression stage 521, where the above-mentioned stages are connected in series on the output side. These stages 51 and respectively 521 operate on the basis of a delay stage, whereby the delay of the interference-suppression stage 521 is negligible because of the high pulsing frequency that is applied to it. Only for conditions (L)(H), which last longer than a time interval $\Delta t$, will a change appear in the signal after the relevant interference-suppression and delay stage or respectively interference-suppression stage, so that noise pulse peaks in the form L-H-L or H-L-H in the output signals v and i of the two comparators 41 and 42, which are shorter than the above-mentioned time interval $\Delta t$, are not transmitted through the relevant interference-suppression and delay element 51 or respectively the interference-suppression element 521. The output signal V of the interference-suppression and delay stage 51 here fulfills the following function. If the rotation speed of the rotor 21 of the reactive motor 2 falls below a certain limit, so that the output signal V of the interference-suppression and delay stage 51 no longer reaches H (for high potential) during a certain time interval, the reset input R of the T-flip-flops TR1 through TR4 of the waiting element 7 and the self-starting stage 8 remains at L (for low potential) during this time interval. It is here presupposed that the switch-over signal $\beta$ was (L) from its preceding state in normal operation, and that at least one of the two output signals N or S of the waiting time element 7 or respectively the third T-flip-flop TR5 of the self-starting stage 8 was in the state (H). If the signal remains in the state (L) during a certain time interval, for example because the rotor 21 of the reactive motor 2 is no longer moving, the output N of the second T-flip-flop TR2 of the waiting element 7 is set into the state (L) and on its part sets the NAND-gates G14 and G15, so that the switch-over signal $\beta$ is set to the state (H) and the negated switch-over signal $\overline{\beta}$ is set to the state (L). After $\beta$ has become H, and as long as the switch-over signal $\beta$ remains in this state, the T-flip-flops TR1–TR5 are prevented from being set to null, since the output of the NOR-gate G34, i.e. the reset signal of the T-flip-flops TR1–TR4, remains in the state (L) on account of $\beta$ =H. As long as the switch-over signal $\beta$ remains in the state (H), self-starting operation will continue according to the principle of a stepping motor with two coils. During this time, the frequency signal $F_o$, which is emitted by the NOR-gate G16 in the self-starting stage 8, assumes different values, in dependence on the point in time within the region where the switch-over signal $\beta$=H. The various values are generated by means of the T-flip-flops TR3–TR4 and the gates G19, G20, as well as the inverter G22 and G23, from the inputted frequency signals of 16 and 32 Hz. Thus, the output signal $F_o$ in the first region, for example, may be 16 Hz and in the second region 32 Hz. The duration of these regions depends on the pulsing frequency of 8 Hz, which is conducted to the first T-flip-flop TR1 of the waiting time element 7, and on the number of T-flip-flops of the entire chain TR1–TR5. By means of the variable frequency $F_o$, the frequency sequence $F_1$ or $F_2$ is generated in the frequency step-down stages D12 and D13, which are connected in series on the output side. The frequency sequences $F_1$ and respectively $F_2$ have half the frequency and respectively a quarter of the frequency of the signal $F_o$. The frequency signals $F_1$, $F_2$, together with the switch-over signal $\beta$, are inputted into the driving logic circuit 9, which is connected in series on the output side, where, with the aid of the NAND-gate, they activate the switches $S_1$–$S_8$ of the switching element 3 in the region where the switch-over signal $\beta$=H, in such a fashion that the above mentioned conditions are fulfilled. In this way, the coils 22 and 23 of the reactive motor 2 have impressed on them the rising frequency, in certain regions, during self-starting operation. This self-starting control increases the rotational speed of the rotor 21, for example, from 0 to 8 rotations per second, since the pulse sequence with frequency 16 Hz generates a rotational speed of 8 revolutions per second, in the case of a rotor with two pole pairs. The switch-over time-points in self-starting operation from one frequency to another can here be specified arbitrarily.

If the output signal S of the third T-flip-flop TR5 of the self-starting stage 8 of the last region goes into the state (L), the switch-over signal $\beta$ jumps to L and the negated switch-over signal $\bar{\beta}$ jumps to H, which implies a change of the previous self-starting operation in the rotation-regulation operation of the reactive motor 2. In rotation-regulation operation, the control coil 23 of the motor 2 serves as a so-called "pick-up" coil, whose output signals lead to the signals V and I, as described above. Since the negated switch-over signal $\bar{\beta}$, after termination of self-starting operation, has jumped into the state (H), the outputs of the linkaging circuit 10 are switched active, and the rotation-regulation operation, as described above, can control the rotational constancy of the reactive motor, as described above.

During self-starting operation, the switch-over signal $\beta$ is in the state (H) and consequently sets the J/K flip-flops of the shift register to high potential. Every desired-frequency signal change from H to L or from L to H, corresponding to the rising or respectively falling edges of the desired-frequency signal, causes another counting step in the shift register and each actual-frequency signal change, i.e. each rising or falling edge of the actual-frequency signal yields a backwards counting step in the shift register or respectively in the up/down-counter. If the output $Q_3$ of the phase comparator 6 is set into the state (H), the working coil 22 is connected as follows to the positive or respectively negative pole of the batter $\pm U_B$.

If the noise-free and delayed actual-frequency signal I is in the State (H), the coil terminal 2 of the working coil 22 is connected to the plus pole of the battery, and the coil terminal 32 of the working coil 22 is connected to the minus pole of the battery $U_B$.

If the noise-free and delayed actual-frequency signal I is in the state (L), the coil terminal 2 of the working coil 22 is connected to the minus pole of the battery, and the terminal 32 of the coil is connected to the plus pole of the battery $U_B$.

On the other hand, if the output $Q_1$ of the phase comparator 6 is in the state L, the working coil 22 is short-circuited, for example, in such a fashion that the coil terminal 2 and the coil terminal 32 are connected to the minus pole of the battery $U_B$.

If the rotor 21, at the end of self-starting operation, has for any reason not reached the rotational speed required for rotational speed regulation operation, self-starting operation is repeated. Since the output signal V from the interference-suppression and delay stage 51 continues in the state L if the rated rotational speed has not been reached, the linkage of the output signals N and S of the waiting time element 7 and of the third T-flip-flop TR5 of the self-starting stage 8, both of which are in state L, takes care that a signal appears at the output of the gate G32, which leads to a reset signal for the T-flip-flop chain TR1–TR4, via the two gates G33 and G34, which are connected in series on the output side. In this way, self-starting operation can repeat.

Figure 12:
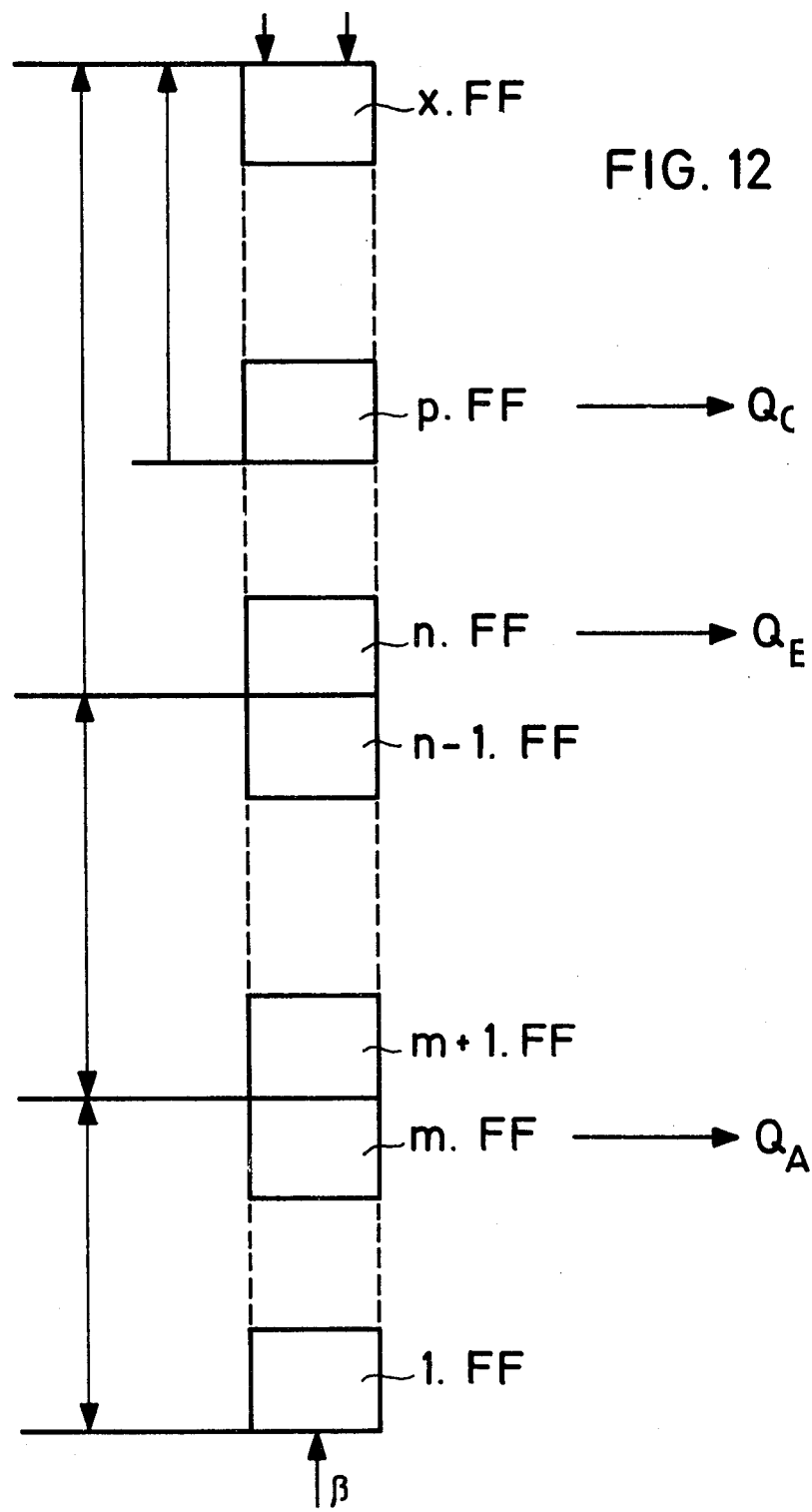
FIG. 12 is a diagram of a shift register consisting of a number of x flip-flops, in accordance with this invention.

FIG. 12 schematically shows a shift register which consists of a number of x-flip-flops. FIG. 11 shows a detailed circuit diagram of the control and regulation arrangement for a reactive motor with self-starting means. This control and regulation arrangement has a shift register in its phase comparator 6, where said shift register is composed of three J/K flip-flops. The number of J/K flip-flops in the shift register can be increased to a number x, so that the various control signals $Q_A$, $Q_B$, $Q_C$ appear in a chain, which comprises x J/K flip-flops. In this way, the memory capacity for the position of the design-value signals before or after the actual-value signals is increased, and the capacity of the entire arrangement to recover lost pulses is improved. The shift register shown in FIG. 12 accordingly contains x flip-flops, to which the design-value signals and actual-value signals are conducted. The first m-flip-flops are here used for memory and for delivering braking pulses. The flip-flops from $m+1$ to $n-1$ are used to store waiting pulses. The flip-flops n to x are used for storing and delivering acceleration pulses in the region of positive polarity of the voltage that is applied to the driving coil. The flip-flops from p through x are used to store and to deliver additional acceleration pulses, even in the negative polarity that is applied to the driving coil. In the embodiment, the output pulses $Q_A$, $Q_B$, $Q_C$ are tapped at the mth, nth, and pth flip-flops of the chain.

Every change of the design-value from H to L or L to H yields another step in the chain of flip-flops in the direction of the xth flip-flop. Every change of the actual-value from H to L or L to H yields another step in the chain of flip-flops in the direction of the first flip-flop. In this way, the regulation sensitivity for delivering braking and acceleration pulses can be adjusted with arbitrary fineness both in the positive and negative polarity.

Figure 13:
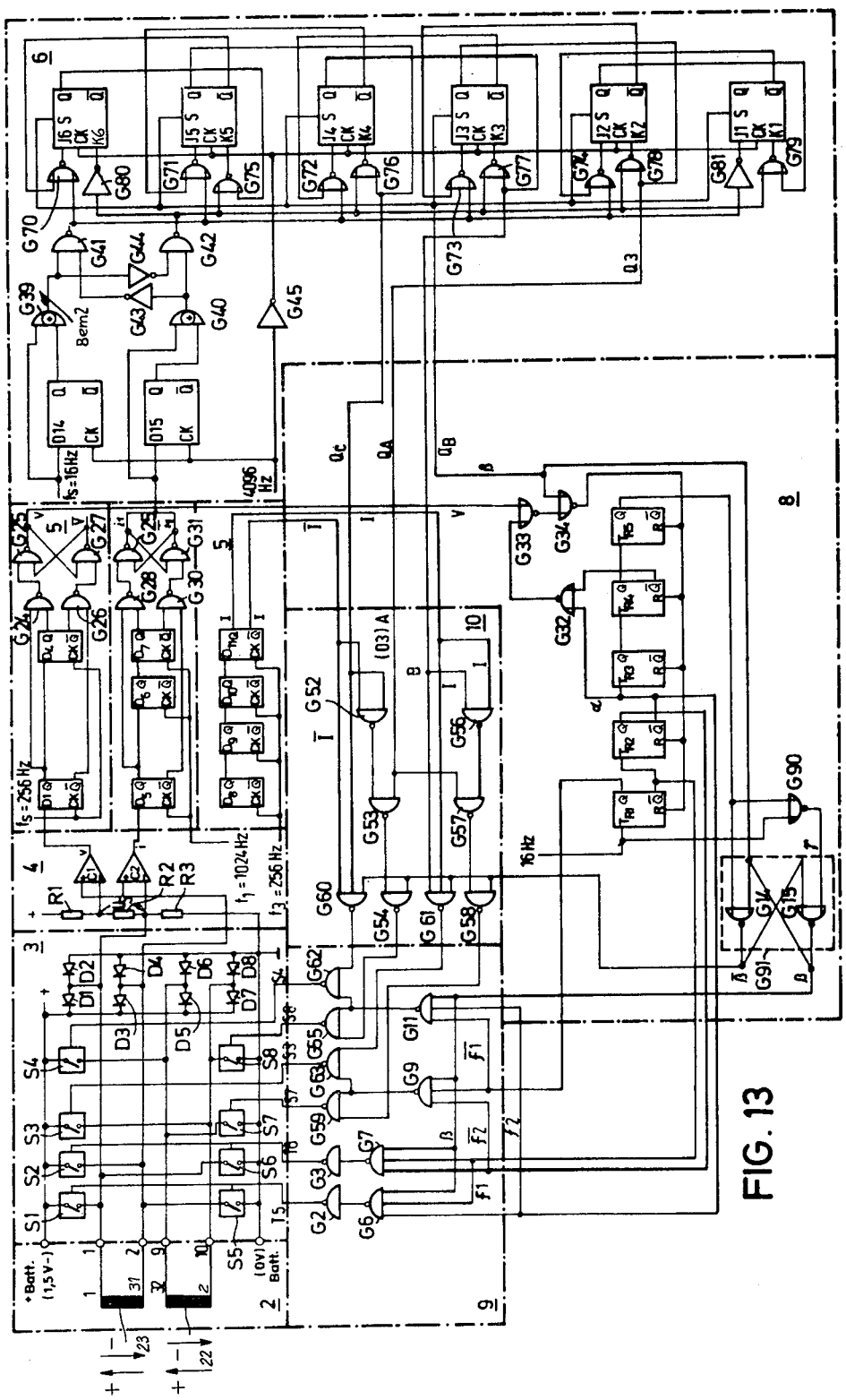
FIG. 13 is a schematic circuit diagram of a control and regulation arrangement for a reactive motor with self-starting according to FIG. 11 of this invention.

FIG. 13 shows a detailed circuit diagram of the control and regulation arrangement for a reactive motor with self-starting means. This arrangement essentially corresponds to the detailed circuit according to FIG. 11. Accordingly, the reactive motor 2, the switching stage 3, the comparison element 4, the interference-suppression and delay element 5, and the driving logic circuit 9 have not been numbered in more detail. Differences from the circuit according to FIG. 11, in the phase comparator 6, the self-starting stage 8, and in the linkage element 10 will be explained in detail below.

The phase comparator 6 contains two pulsed flip-flops D14, D15, whose pulsing inputs $C_k$ have impressed on them the second pulsing frequency $f_2$ of 4096 Hz. The input of the first pulsed flip-flop D14 has impressed on it the desired-frequency $f_s$, for example 16 Hz. On the other hand, the noise-free actual-frequency signal $i_1$ is applied to the input of the second pulsed flip-flop D15. The outputs Q of the two pulsed flip-flops D14 and D15 lead to one input each of EXCLUSIVE OR-gates G39 and G40. The inputs of these gates have applied to them the desired frequency signal $f_s$ or respectively the noise-free actual-frequency signal $i_1$. The outputs of the two EXCLUSIVE OR-gates G39 and G40 are connected to one input each of a NAND-gate G41 or respectively G42 and through an inverter G43 or G44 to the other input of said NAND-gate G41 or respectively G42. The outputs of these two NAND-gates G41 and G42, together with the second pulsing frequency $f_2$, which is conducted over an inverter G45 and together with the switch-over signal $\beta$, is connected to the shift register comprising six J/K flip-flops J1–J6 as well as ten OR-gates G70–G79 as well as two other inverters G80 and G81. The setting-inputs S of the J/K flip-flops J1–J6 have applied to them the switch-over signal $\beta$, while the pulsing inputs $C_k$ of the flip-flops J1–J6 are connected to the inverted pulsing frequency $f_2$. The J-input of the first J/K flip-flop J1 is connected to the output of the inverter G81, and the J-inputs of the second through sixth J/K flip-flops J2–J6 are connected to the outputs of the OR-gates G70–G74. The K-inputs of the first five J/K flip-flops J1–J5 are connected to the outputs of the other OR-gates G75–G79, and the K-inputs of the sixth J/K flip-flop J6 is connected to the output of the other inverter G80. One input of the OR-gates G70–G74 which are connected to the J-inputs on their output side, and the input of the inverter G81 are connected to the output of the first NAND-gate G41. The inputs of the OR-gates G75 and G79, which are connected with the K-inputs, and the input of the other inverter G80 are connected with the output of the second NAND-gate G42. The other input of the OR-gate G70–G74, which is connected with the J-inputs of the J/K flip-flops, is connected to the negated output $\bar{Q}$ of the respectively preceding J/K flip-flops J1–J5. The other inputs of the OR-gates G75–G79, which are connected with the K-inputs of the J/K flip-flops J1–J5, are connected to the output Q of the respectively followiing J/K flip-flops J2–J6. At the outputs Q of the third, fourth, and fifth J/K flip-flops J3–J5, the appropriate braking or respectively accelerating pulses $Q_A$, $Q_B$, and $Q_C$ are connected to the linkage logic circuit 10, which is connected in series on the output side.

By means of the eight NAND-gates of the linkage logic 10, the output signals I, $\bar{I}$ as well as $Q_A$, $Q_B$, and $Q_C$ of the delay stage 522 or respectively of the phase comparator 6, as well as the negated switch-over signal $\beta$, are connected with the output of the respectively preceding NAND-gate in the following fashion:

(a) Gate G52: Signal $\bar{I}$ and $Q_C$
(b) Gate G56: Signal $Q_B$ and I
(c) Gate G53: Output signal of the gate G52 and signal $Q_A$
(d) Gate G57: Output signal of the gate G56 and signal $Q_A$
(e) Gate G60: Switch-over signal $\beta$, signal $\bar{I}$ and signal $Q_C$
(f) Gate G54: Output signal of the gate G53 and switch-over signal $\beta$
(g) Gate G61: Switch-over signal $\beta$, signal $Q_B$ and I
(h) Gate G58: Output signal of the gate G57 and switch-over signal $\beta$ In this embodiment, besides the noise-free and delayed self-starting signal V—which is delivered by the interference-suppression and delay stage 51—only one other frequency signal, and specifically the pulsing signal of the waiting time element 7, is applied to the self-starting stage 8. The reset inputs of the two delay stages TR1 and TR2 of the waiting time element 7, and the T-flip-flops TR3–TR5 of the self-starting stage 8, are synchronously reset, in dependence on the noise-free and delayed self-starting signal V, which is likewise applied, and in dependence on the switch-over signal $\beta$, which is emitted by the self-starting stage 8.

The self-starting stage 8, in this embodiment, consists of three T-flips-flops TR3–TR5, whose inputs are connected with the output Q of the preceding flip-flop or respectively have applied to them the output signal of the waiting time element 7. Corresponding to the embodiment according to FIG. 11, the output of the last T-flip-flop TR5, together with the frequency signal, is applied to a NAND-gate, whose output signal, together with the output signal of the third T-flip-flop TR5, is applied to the input of the multivibrator stage, which consists of two NAND-gates, that are connected together in a well-known fashion. The switch-over signal $\beta$ or respectively the negated switch-over signal $\bar{\beta}$ is present at the output of this multivibrator stage. The reset signal for the T-flip-flops of the waiting time element 7 and of the self-starting stage 8 is generated analogously to the circuit of FIG. 11. In this embodiment, the outputs Q and $\bar{Q}$ of the two divider stages TR1 and TR2 of the waiting time element 7 are used to specify various frequency signals. Here, the inputted pulsing frequency of e.g. 1680 Hz is divided down to 8 Hz or respectively 4 Hz, and consequently the frequency signals $F_1$, $\bar{F}_1$ and $F_2$, $\bar{F}_2$ are specified.

The output signals of the self-starting stage 8 and the output signals of the linkage stage 10 are connected together in the driving logic circuit 9, which is connected in series on the output side, in such a fashion that they satisfy the following truth table for activating the switches S1–S8 of the switching element 3:

| Driving Signals | | | | | | FET Switches | | | | | | | |
|---|---|---|---|---|---|---|---|---|---|---|---|---|---|
| $\bar{\beta}$ | $Q_C$ | $Q_B$ | $Q_A$ | I | $\bar{I}$ | S1 | S2 | S3 | S4 | S5 | S6 | S7 | S8 |
| H | L | L | H | X | X | OFF | OFF | OFF | OFF | OFF | OFF | OFF | OFF |
| H | L | L | L | X | X | ↓ | ↓ | OFF | OFF | ↓ | ↓ | ON | ON |
| H | L | L | H | X | X | ↓ | ↓ | OFF | OFF | ↓ | ↓ | OFF | OFF |
| H | L | H | H | H | L | ↓ | ↓ | ON | OFF | ↓ | ↓ | ON | OFF |
| H | L | H | H | L | H | ↓ | ↓ | OFF | OFF | ↓ | ↓ | OFF | OFF |
| H | H | H | H | H | L | ↓ | ↓ | ON | OFF | ↓ | ↓ | ON | OFF |
| H | H | H | H | L | H | OFF | OFF | OFF | ON | OFF | OFF | OFF | ON |

Figure 14:
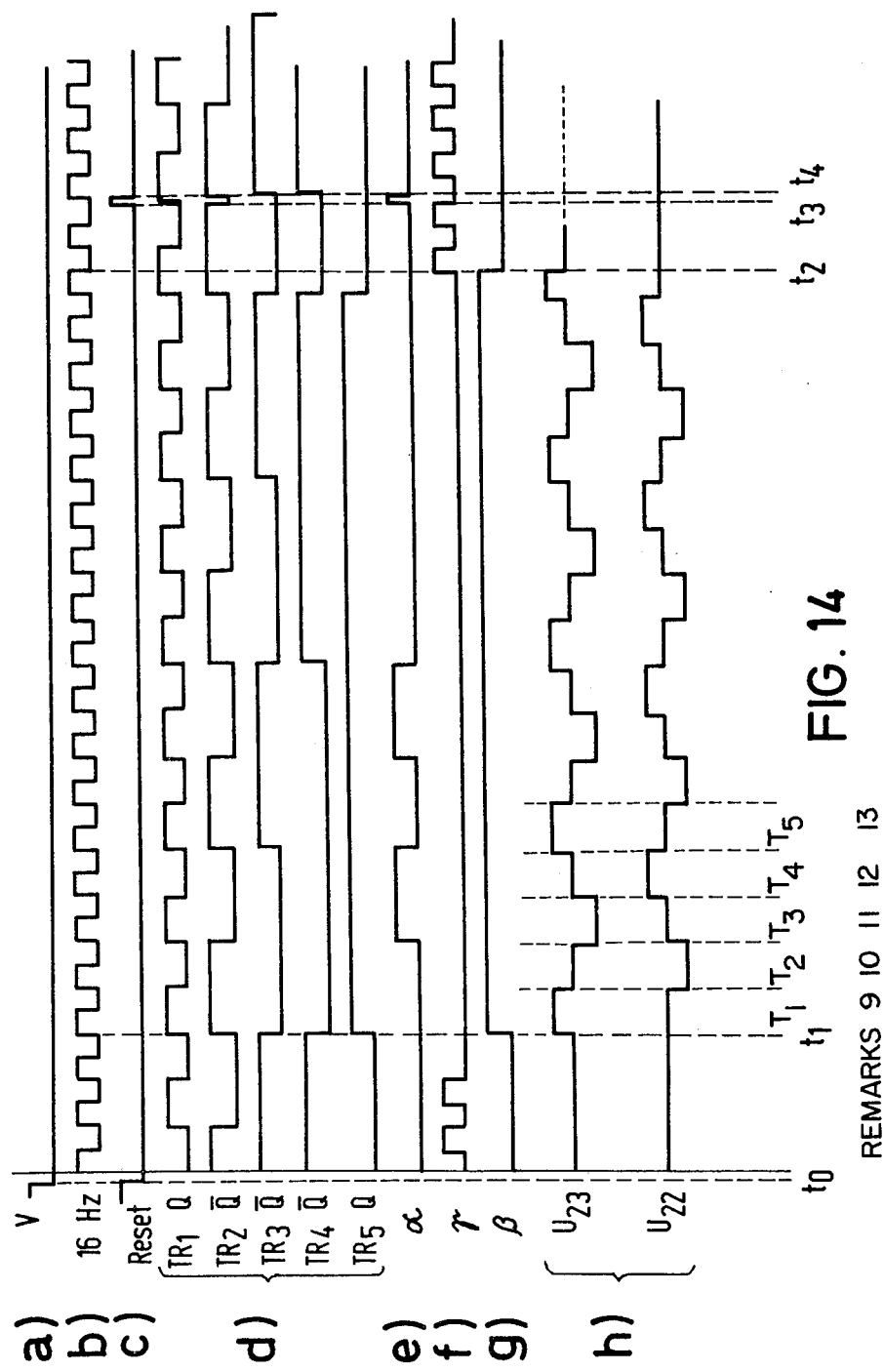
FIG. 14 is a time plot of the pulses and signals corresponding to the arrangement of FIG. 13 of this invention.

In connection with the time display of the signals according to FIG. 14, the mode of functioning of the arrangement according to FIG. 13 will be explained in more detail. In FIG. 14, from the top to the bottom, the following signals are shown:

(a) the self-starting signal V;
(b) the 16 Hz pulsing frequency for the waiting time element in the embodiment according to FIG. 13, from which the frequency signal supplied to self-starting statge 8 is derived and therefore directly related to;
(c) the reset signal for resetting the T-flip-flops of the self-starting stage of the waiting time element;
(d) the output signals of the T-flip-flops of the self-starting stage and of the waiting time element;
(e) the output signal $\alpha$ of the waiting time element;
(f) the output signal $\gamma$ of the NAND-element G90;
(g) the switch-over signal $\beta$; and
(h) the voltage of the coils 22 and 23 of the reactive motor 2.

If the rotational speed of the rotor 21 of the motor 2 falls below a certain limit, so that the output signal V no longer reaches a high potential for a certain time interval, the common reset input R of the T-flip-flops TR1–TR5 of the waiting time element 7 and of the self-starting stage 8 remain at low potential during this time interval. It is here presupposed that the switch-over signal β was in the state of low potential during the preceding regulation operation, and that at least one of the two output signals α or the negated output signal of the second T-flip-flop of the self-starting stage 8 was in the state of high potential. During the total time range under consideration here, the output signal V is in the state of low potential, for example, because the rotor 21 of the motor 2 is no longer moving. With the dropping of self-starting signal V, the reset signal also vanishes at time $t_o$ (FIG. 14c). Thus the T-flip-flops TR1-TR5 are switched active and step down the inputted pulsing frequency, for example from 16 Hz (FIG. 14b) according to the graph in FIG. 14d, which shows the negated outputs of the T-flip-flops Tr1-Tr4 or respectively the output Q of the fifth T-flip-flop Tr5. As long as the output Q of the fifth T-flip-flop Tr5 is in state L, a signal γ, corresponding to the pulsing frequency, appears at the output of the gate G90. If the self-starting signal V remains in the state L during a certain time interval, the flip-flop G91 is set, so that the switch-over signal β is set into the state H at time $T_1$, and the negated switch-over signal β is set into the state L. After the switch-over signal β has been set into the state H, and as long as the switch-over signal β remains in this state, resetting of the T-flip-flops TR1-TR5 is prevented, since the reset signal for the five T-flip-flops TR1-TR5 remains in the state L because β=H. As long as the switch-over signal β remains in the state H, self-starting operation will continue according to the principle of a stepping motor with two coils. During this time, the two coils 22 and 23 of the reactive motor 2 have applied to them the frequency signals according to FIG. 14h, which are composed, by means of the driving logic circuit, from the frequencies that are emitted from the first and second T-flip-flops TR1 and TR2 at their outputs Q or respectively negated outputs $\overline{Q}$ This is done in such a fashion that the switching table for switches S1-S8 is fulfilled as specified above. During the high range from time $T_1$-$T_2$, this switching logic for the switches S1-S8 results in the pulse train for the coils 22 and 23 which is shown in FIG. 14h.

If the output signal Q of the fifth T-flip-flop TR5 is set into the stage L, the flip-flop G91 is set to L with the switch-over signal β and is set to H with the negated switch-over signal β, after another cycle of the inputted frequency signal, for example a 16 Hz signal, has elapsed. At time $t_2$, this implies a change of the previous self-starting operation into normal regulation operation. The results of this type of pulse linkage is that the last self-starting pulse has half the width, corresponding to the inputted pulsing frequency, of the preceding self-starting pulses. At time $T_3$, a signal according to FIG. 14e is emitted by the second T-flip-flop TR2 at a negated output. This signal leads to the reset pulse according to 14c, whose falling edge occurs at time $t_4$. This terminates self-starting operation. In the subsequent normal regulation operation, the second coil 23 of the reactive motor 2 serves as a control coil or as a pickup coil, whose output signal leads to the signals V and I, as described above.

While an embodiment and application of this invention has been shown and described, it will be apparent to those skilled in the art that many more modifications will be possible without departing from the inventive concept herein described.

What is claimed and desired to be secured by Letters Patent of the United States is:

1. A control circuit for driving an electric motor at a substantially constant desired rotational speed and for accelerating said motor after a stoppage thereof or the application of an adverse resistive torque thereto, said motor including a rotor having at least one pair of permanent magnetic poles and a stator provided with a first and a second coil, said control circuit comprising:
   control means for detecting the rotational speed of said rotor and for supplying energizing pulses to said first or said second coil dependent upon said detected speed, said control means having at least two modes:
   a normal speed mode wherein the rotational speed of said rotor is detected by said first coil and wherein only said second coil is supplied with said energizing pulses at a frequency substantially corresponding to single coil driving of said rotor at said desired rotational speed; and
   a self-starting mode wherein said energizing pulses are supplied alternately to said first and said second coil to accelerate said rotor to said desired rotational speed;
   said control means including rotor acceleration and braking means, operable during said normal speed mode and comprising:
   means for generating desired frequency pulses of a predetermined width and phase;
   means for generating actual frequency pulses of a width and phase indicative, respectively, of the rotational speed and angular disposition of said rotor;
   means for comparing the widths and phases of said desired and said actual frequency pulses; and
   accelerating and braking pulse generating means for generating energizing pulses which exert an accelerating force on said rotor whenever the phase of said actual frequency pulses leads the phase of said desired frequency pulses and for generating braking pulses which exert a braking force upon said rotor by effecting a short circuiting of one of said coils whenever the phase of said actual frequency pulses leads the phase of said desired frequency pulses.

2. A control circuit according to claim 1, wherein said rotor acceleration and braking means comprises:
   delay means for delaying said actual frequency pulses ($i_l$) to produce a delayed actual frequency signal (I, $\overline{I}$);
   means for generating said accelerating and braking energizing pulses for a time duration corresponding to the phase offset between either the rising or falling edges of said actual and desired frequency pulses; and
   means for further limiting the time durations of said accelerating and braking energizing pulses dependent upon the state of said delayed actual frequency signal.

3. A control circuit according to claim 2, wherein said accelerating and braking energizing pulses satisfy the following conditions:
   (1) whenever the phase of said desired frequency pulses ($f_s$) leads the phase of said actual frequency pulses ($i_l$);
      (a) within the negative half wave region of the voltage curve existing in the energized coil, said accelerating energizing pulses begin with the rising edges of said desired frequency pulses ($f_s$) and end with the rising edges of said actual frequency pulses ($i_I$), said accelerating energizing pulses being further limited to the time during which said delayed actual frequency signal (I) is low; and (b) within the positive half wave region of the voltage curve existing in the energized coil, said accelerating energizing pulses begin with the falling edges of said desired frequency pulses ($f_s$) and end with the falling edges of said actual frequency pulses ($i_I$), said accelerating energizing pulses being further limited to the time during which said delayed actual frequency signal (I) is high; and (2) whenever the phase of said actual frequency pulses ($i_I$) leads the phase of said desired frequency pulses ($f_s$);

(a) within the negative half wave region of the voltage curve existing in the energized coil, said decelerating energizing pulses begin with the rising edges of said actual frequency pulses ($i_I$) and end with the rising edges of said desired frequency pulses ($f_s$); and (b) within the positive half wave region of the voltage curve existing in the energized coil, said decelerating energizing pulses begin with the falling edges of said actual frequency pulses ($i_I$) and end with the falling edges of said desired frequency pulses ($f_s$).

4. A control circuit as in claim 3, wherein said control means and said rotor acceleration and braking means further includes;

positive and negative voltage supply terminals;

oscillator and divider means for generating said desired frequency pulses ($f_s$) and additional timing pulses at a plurality of frequencies;

detection means for detecting the rotational speed of said rotor and for generating a sensor signal ($U_n$) indicative thereof;

comparator and digitizing means for comparing said sensor signal to a first reference voltage, for generating from said comparison digitized actual frequency pulses ($i_I$) having widths corresponding to the periods of time during which said sensor signal voltage exceeds said first reference voltage, for comparing said sensor signal to a second reference voltage, and for generating threshold speed monitoring signals having widths corresponding to the time periods during which said sensor signal voltage exceeds said second reference voltage;

interference-suppression and delay means for receiving said actual frequency pulses ($i_I$) and said threshold speed monitoring signals (v) and for generating therefrom delayed and substantially interference free actual frequency pulses (I, Ī) and threshold speed monitoring signals (V);

self-starting pulse generating means for generating self-starting pulses at an initial frequency lower than the frequency corresponding to double coil driving of said rotor at said desired speed and thereafter at at least one double coil driving frequency higher than said initial frequency;

said self-starting pulse generating means including a self-starting stage (8) having a first input for receiving said delayed threshold speed monitoring signal (V), a second input for receiving a waiting time signal (N), a first output for generating a first pulse train ($F_1$, $\overline{F}_1$), a second output for generating a second pulse train ($F_2$, $\overline{F}_2$) and a third output for generating a switchover initiation signal ($\beta$);

a waiting time element (7) having an input for receiving said delayed threshold speed monitoring signal (V) and an output for generating said waiting time signal (N);

phase comparator means for comparing the phases of said actual frequency pulses ($i_I$) and said desired frequency pulses ($f_s$) and for generating, based upon said comparison, accelerating and braking control pulses (Q1, Q3);

a linkage logic circuit (10) haivng a first input for receiving said delayed actual frequency pulses (I, Ī), a second input for receiving said accelerating and braking control pulses (Q1,Q3), and an output;

a driving logic circuit (9) having an input electrically coupled to the output of said linkage logic circuit (10) and having an output for generating a stream of switching signals (Tn,Sn); and a switching circuit (3) electrically interposed betwen said voltage supply terminals and said first and second coils and having a plurality of electrically operated switches for receiving said switching signals and, in response thereto, selectively connecting said first or second coil to one of said terminals or selectively short circuiting one of said coils.

5. A control circuit according to claim 4, wherein said phase comparator (6) comprises:

(a) a first pulsed flip-flop (D14) having a data input to which said desired frequency pulses ($f_s$) are applied, a pulsing input ($C_k$) to which a selected one of said timing frequencies ($f_2$) is applied, and an output (Q);

(b) a second pulsed flip-flop (D15) having a data input to which said actual value frequency pulses ($i_I$) are applied, a pulsing input to which said selected one of said timing frequencies ($f_2$) is applied, and an output (Q); and (c) accelerating and braking pulse storage means having at least two inputs for receiving said outputs from said first and second pulsed flip-flops (D14,D15).

6. A control circuit as in claim 5, wherein said pulse storage means includes:

(a) desired frequency change storage means for storing each change of state of said desired frequency signal ($f_s$); and (b) actual frequency change means for storing each change of state of said actual frequency signal ($i_I$).

7. A control circuit according to claim 6, wherein said pulse storage means further comprises a number x of J/K flip-flops each having a setting input to which said switchover signal ($\beta$) is applied, and wherein the first number m of said J/K flip-flops provide braking pulse storage means for storing said braking pulses, wherein the succeeding number m+1 through n−1 of J/K flip-flops provide waiting pulse storage means for storing waiting pulses, and wherein the succeeding and remaining number n through x of J/K flip-flops provide first acceleration pulse storage means for storing first acceleration pulses of positive polarity, of which the number p through x of J/K flip-flops provide additional acceleration pulse storage means for storing additional acceleration pulses of negative polarity, where $m < n < p < x$.

8. A control circuit as in claim 7, further including linkage circuitry comprising:

(a) a first exclusive OR-gate (G39) having first and second inputs to which are applied, resepectively, said desired frequency signal ($f_s$) and said output (Q) of said first pulsed flip-flop (D14), said first exclusive OR-gate additionally having an output;
(b) a second exclusive OR-gate (G40) having first and second inputs to which are applied, respectively, said selected pulsing frequency ($f_2$) and said output (Q) of said second pulsed flip-flop (D15), said second exclusive OR-gate additionally having an output; and
(c) first and second NAND-gates (G41,G42), each having a first input connected to the output of one of said exclusive OR-gates and a second input connected to the output of the other of said exclusive OR-gates through an inverter (G43,G44); and wherein
(d) the outputs of said first and second NAND-gates, said switchover signal ($\beta$) and an inverted version of said selected pulsing frequency ($f_2$) are supplied to said pulse storage means.

9. A control circuit according to claim 5, wherein said pulse storage means comprises a shift register.

10. A control circuit according to claim 5, wherein said pulse storage means comprises an up/down counter.

11. A control circuit as in claim 8, wherein said pulse storage means contains three J/K flip-flops (J1–J3) as well as four NOR-gates (G46, G48, G49, G51) as well as two other inverters (G47,G50); the pulsing inputs ($C_k$) of the J/K flip-flops (J1–J3) are connected to the inverted second pulsing freqeuency ($f_2$), the J-inputs of the J/K flip-flops (J1–J3) are connected to the outputs of the NOR-gates (G46,G48) or respectively to the outputs of the inverter (G50); the two NOR-gates (G46,G48) and the inverter (G50) are connected to the output of the first NAND-gate (G41); the two other inputs of the NOR-gates (G46,G48) are connected to the negated outputs ($\overline{Q}$) of the second J/K flip-flop (J2) or respectively of the first J/K flip-flop (J1); the K-inputs of the three J/K flip-flops (J1–J3) are connected in cyclic permutation with the outputs of the inverter (G47) or respectively with the two NOR-gates (G49,G51): one input each of the two NOR-gates (G49,G51) and the inputs of the inverter (G47) are connected to the output of the second NAND-gate (G42); and the two other inputs of the NOR-gates (G49,G50) are connected with the outputs (Q) of the second or respectively third J/K flip-flop (J2,J3).

12. A control circuit as in claim 11 wherein said pulse storage means contains six J/K flip-flops (J1–J6) as well as ten NOR-gates (G70–G79) as well as two additional inverters (G80,G81); the pulsing inputs ($C_K$) of the J/K flip-flops (J1–J6) are connected to the inverted second pulsing frequency ($f_2$); the J-inputs of the J/K flip-flops (J1–J6) are connected to the outputs of the NOR-gates (G70–G74) or respectively to the output of one inverter (G81); respectively one input of the NOR-gates (G70–G74) and the inverter (G81) is connected to the output of the first NAND-gate (G41); the other inputs of the NOR-gates (G70–G74) are connected to the negated output ($\overline{Q}$) of the respectively preceding J/K flip-flop (J1–J5); the K-inputs of the first five J/K flip flops (J1–J5) are connected to the outputs of the other NOR-gates (G75–G79), and the K-input of the sixth J/K flip-flop (J6) is connected to the output of another inverter; one input each of the NOR-gates (G75–G79) and the input of the other inverter (G80) are connected to the output of the second NAND-gate (G42), and the other inputs of the NOR-gates (G75–G79) are connected to the output Q of the next following J/K flip flop (J2–J6); and the outputs (Q) of the third, forth, and fifth, J/K flip-flop (J3–J5) are connected to the inputs of the linkage stage (10), which is connected in series on the load side.

13. A control circuit as in claim 8, wherein the output signals of said self-starting stage (8) and of said phase comparator (6) are linked in said linkage logic circuit (10) and in said driving logic circuit (9) in such a fashion that they satisfy the following truth table and that they lead to the following switching conditions of the switches (S1–S8) of the switching stage (3):

| Driving Signals | | | | | | FET Switches | | | | | | | | Re- |
| --- | --- | --- | --- | --- | --- | --- | --- | --- | --- | --- | --- | --- | --- | --- |
| $\beta$ | $Q_c$ | $Q_b$ | $Q_a$ | I | $\overline{I}$ | S1 | S2 | S3 | S4 | S5 | S6 | S7 | S8 | marks |
| H | L | L | H | X | X | OFF | OFF | OFF | OFF | OFF | OFF | OFF | OFF | 1 |
| H | L | L | L | X | X | ↓ | ↓ | OFF | OFF | ↓ | ↓ | ON | ON | 2 |
| H | L | L | H | X | X | ↓ | ↓ | OFF | OFF | ↓ | ↓ | OFF | OFF | 3 |
| H | L | H | H | H | L | ↓ | ↓ | ON | OFF | ↓ | ↓ | ON | ON | 4 |
| H | L | H | H | L | H | ↓ | ↓ | OFF | OFF | ↓ | ↓ | OFF | OFF | 5 |
| H | H | H | H | H | L | ↓ | ↓ | ON | OFF | ↓ | ↓ | ON | OFF | 6 |
| H | H | H | H | L | H | OFF | OFF | OFF | ON | OFF | OFF | OFF | ON | 7 |
| L | L | L | H | X | X | OFF | OFF | OFF | OFF | OFF | OFF | OFF | OFF | 8 |
| L | L | L | L | H | L | OFF | ON | OFF | OFF | OFF | ON | OFF | OFF | 9 |
| L | L | L | H | L | H | OFF | OFF | OFF | ON | OFF | OFF | OFF | ON | 10 |
| L | L | H | H | H | L | ON | OFF | OFF | OFF | ON | OFF | OFF | OFF | 11 |
| L | H | H | H | L | H | OFF | OFF | ON | OFF | OFF | OFF | ON | OFF | 12 |
| L | H | H | H | H | L | OFF | ON | OFF | OFF | OFF | ON | OFF | OFF | 13 | wherein the following conditions are indicated:
1 non pulses on coil 22
2 coil 22 in short circuit on OV
3 no pulses on coil 22
4 + pulse on coil 22
5 no pulses on coil 22
6 + pulse on coil 22
7 − pulse on coil 22
8 no pulses on coil 22 or 23
9 + pulse on coil 23
10 − pulse on coil 22
11 − pulse on coil 23
12 + pulse on coil 22
13 + pulse on coil 23.

* * * * *